US012658179B2

(12) United States Patent
Wang et al.

(10) Patent No.: US 12,658,179 B2
(45) Date of Patent: Jun. 16, 2026

(54) VOICE DATA PROCESSING METHODS AND APPARATUSES, AND VOICE INTENTION UNDERSTANDING METHODS AND SYSTEMS

(71) Applicant: Alipay (Hangzhou) Information Technology Co., Ltd., Hangzhou (CN)

(72) Inventors: Yinggui Wang, Hangzhou (CN); Li Wang, Hangzhou (CN); Lei Wang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 477 days.

(21) Appl. No.: 18/477,193

(22) Filed: Sep. 28, 2023

(65) Prior Publication Data

US 2024/0119926 A1     Apr. 11, 2024

(30) Foreign Application Priority Data

Sep. 30, 2022     (CN) .......................... 202211215274.3

(51) Int. Cl.
*G10L 15/00*          (2013.01)
*G10L 15/02*          (2006.01)
              (Continued)

(52) U.S. Cl.
CPC .............. *G10L 15/08* (2013.01); *G10L 15/02* (2013.01); *G10L 15/22* (2013.01); *G10L 15/16* (2013.01)

(58) Field of Classification Search
CPC ....... G10L 15/16; G10L 19/005; G10L 19/00; G10L 17/18; G10L 25/27; G10L 25/30;
              (Continued)

(56) References Cited

U.S. PATENT DOCUMENTS

| 9,767,806 B2 * | 9/2017 | Giménez ................. G10L 17/22 |
| 2019/0086508 A1 * | 3/2019 | Isberg ................. H04W 64/006 |
| 2021/0005190 A1 | 1/2021 | Ji et al. |

FOREIGN PATENT DOCUMENTS

| CN | 110781519 A | 2/2020 |
| CN | 111681662 A | 9/2020 |

(Continued)

OTHER PUBLICATIONS

Tian, "Frequency irrelevance and its applications in one-key cryptosystems," Journal of Shenzhen University Science and Engineering, Jan. 2015, 32(1):32-39 (with English abstract).

*Primary Examiner* — Vu B Hang
(74) *Attorney, Agent, or Firm* — Fish & Richardson P.C.

(57)          ABSTRACT

Voice data processing for voice intention understanding includes performing voice data feature extraction on voice data to obtain first feature data. Local frequency domain transform processing is performed on the first feature data to obtain at least one feature map including a plurality of elements and corresponding to one data block in the first feature data, each element corresponding to one frequency in a frequency domain. Constructing, by separately using an element corresponding to each frequency in the at least one feature map a frequency component channel feature map corresponding to each frequency. Selecting at least one target frequency component channel feature map from the constructed frequency component channel feature maps to obtain desensitized feature data of the voice data, where the selected target frequency component feature map is a critical channel feature for voice intention understanding and is a non-critical channel feature for voice signal recognition.

20 Claims, 15 Drawing Sheets

(51) Int. Cl.
    *G10L 15/08*         (2006.01)
    *G10L 15/22*         (2006.01)
    *G10L 15/16*         (2006.01)

(58) Field of Classification Search
    CPC ......... G10L 25/03; G10L 25/24; G10L 25/51;
                    G10L 15/02; G10L 15/12; G10L 15/07;
                    G10L 15/08; G10L 15/20; G10L 15/22;
                    G10L 15/26; G10L 15/30; G10L 17/00;
                    G10L 17/02; G10L 17/04; G10L 17/06;
                    G10L 17/08; G10L 17/10; G10L 17/12;
                    G10L 17/14; G10L 17/16; G10L 17/20;
                                        G10L 17/26
    See application file for complete search history.

(56)                 References Cited

FOREIGN PATENT DOCUMENTS

| | | | |
|---|---|---|---|
| CN | 112966090 A | 6/2021 | |
| CN | 112966737 A | 6/2021 | |

\* cited by examiner

*200*

| Perform voice data feature extraction on voice data to obtain first feature data | *210* |

| Perform local frequency domain transform on the first feature data to obtain at least one feature map, where each feature map includes a plurality of elements and corresponds to one data block in the first feature data, and each element corresponds to one frequency in frequency domain | *220* |

| Separately use an element corresponding to each frequency in the at least one feature map to construct a frequency component channel feature map corresponding to each frequency | *230* |

| Select at least one target frequency component channel feature map from the constructed frequency component channel feature maps, where the selected target frequency component channel feature map is a critical channel feature for voice intention understanding and is a non-critical channel feature for voice data recognition | *240* |

Perform pre-emphasis processing on voice data — *310*

Perform framing on the pre-emphasized voice data — *320*

Perform windowing on each frame of voice data — *330*

Perform fast Fourier transform on the windowed voice data — *340*

Perform processing by using a Mel filter bank — *350*

Perform logarithmic calculation — *360*

| | | |
|---|---|---|
| f11 | f21 | f31 |
| f41 | f51 | f61 |
| f71 | f81 | f91 |

61

| | | |
|---|---|---|
| f12 | f22 | f32 |
| f42 | f52 | f62 |
| f72 | f82 | f92 |

62

| | | |
|---|---|---|
| f13 | f23 | f33 |
| f43 | f53 | f63 |
| f73 | f83 | f93 |

63

| | | |
|---|---|---|
| f14 | f24 | f34 |
| f44 | f54 | f64 |
| f74 | f84 | f94 |

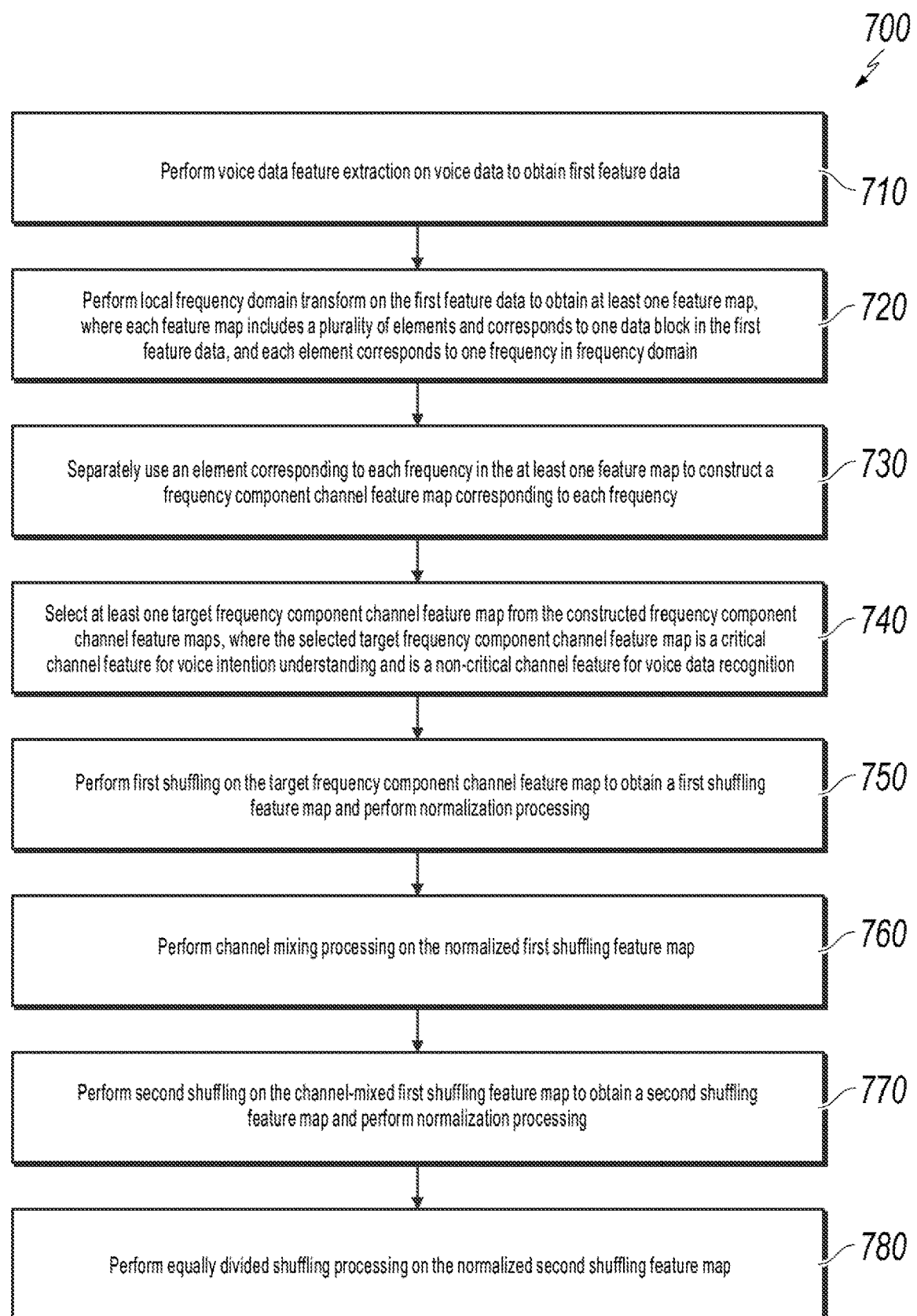

Perform voice data feature extraction on voice data to obtain first feature data — 710

Perform local frequency domain transform on the first feature data to obtain at least one feature map, where each feature map includes a plurality of elements and corresponds to one data block in the first feature data, and each element corresponds to one frequency in frequency domain — 720

Separately use an element corresponding to each frequency in the at least one feature map to construct a frequency component channel feature map corresponding to each frequency — 730

Select at least one target frequency component channel feature map from the constructed frequency component channel feature maps, where the selected target frequency component channel feature map is a critical channel feature for voice intention understanding and is a non-critical channel feature for voice data recognition — 740

Perform first shuffling on the target frequency component channel feature map to obtain a first shuffling feature map and perform normalization processing — 750

Perform channel mixing processing on the normalized first shuffling feature map — 760

Perform second shuffling on the channel-mixed first shuffling feature map to obtain a second shuffling feature map and perform normalization processing — 770

Perform equally divided shuffling processing on the normalized second shuffling feature map — 780

FIG. 7

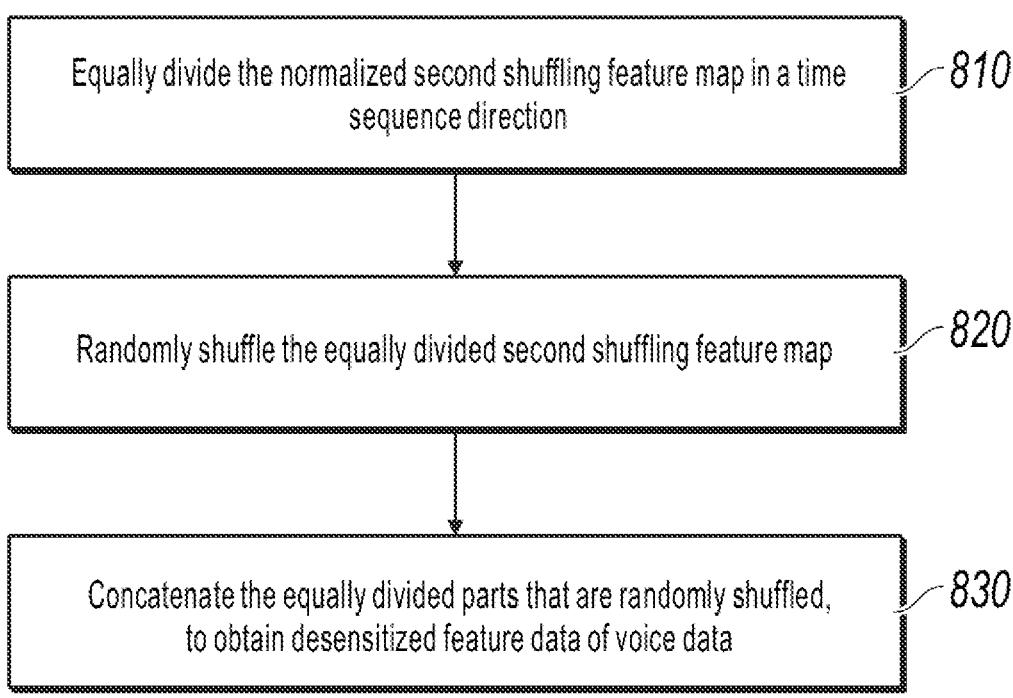
800
Equally divide the normalized second shuffling feature map in a time sequence direction ⌐810
Randomly shuffle the equally divided second shuffling feature map ⌐820
Concatenate the equally divided parts that are randomly shuffled, to obtain desensitized feature data of voice data ⌐830
FIG. 8

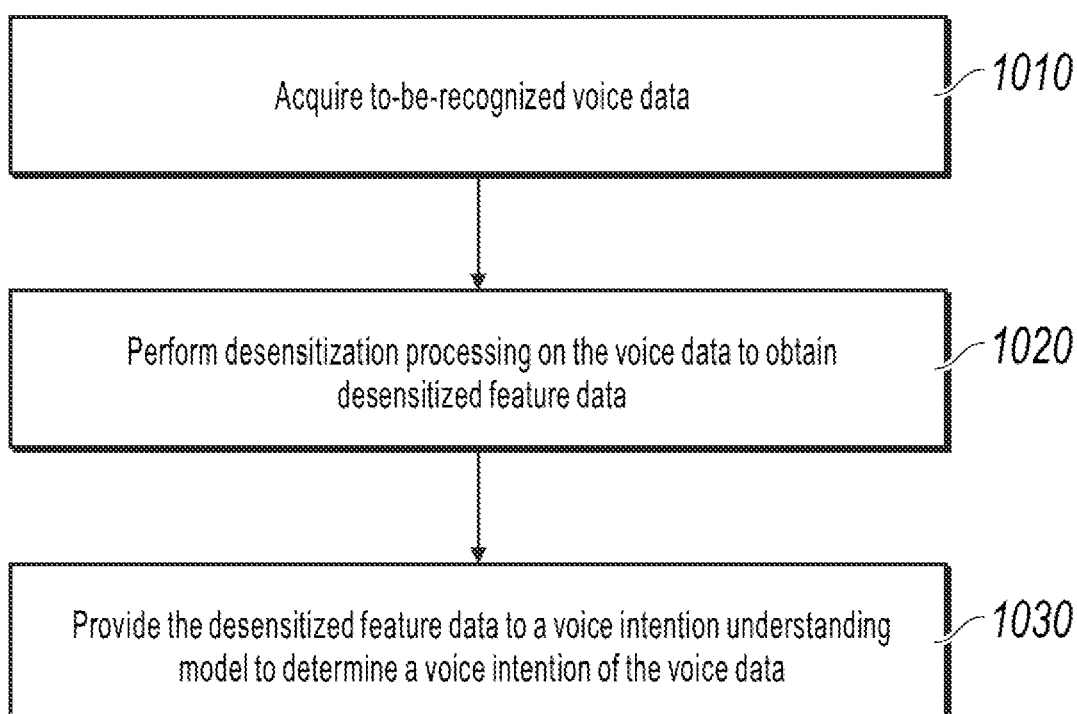
Acquire to-be-recognized voice data — 1010
Perform desensitization processing on the voice data to obtain desensitized feature data — 1020
Provide the desensitized feature data to a voice intention understanding model to determine a voice intention of the voice data — 1030
FIG. 10

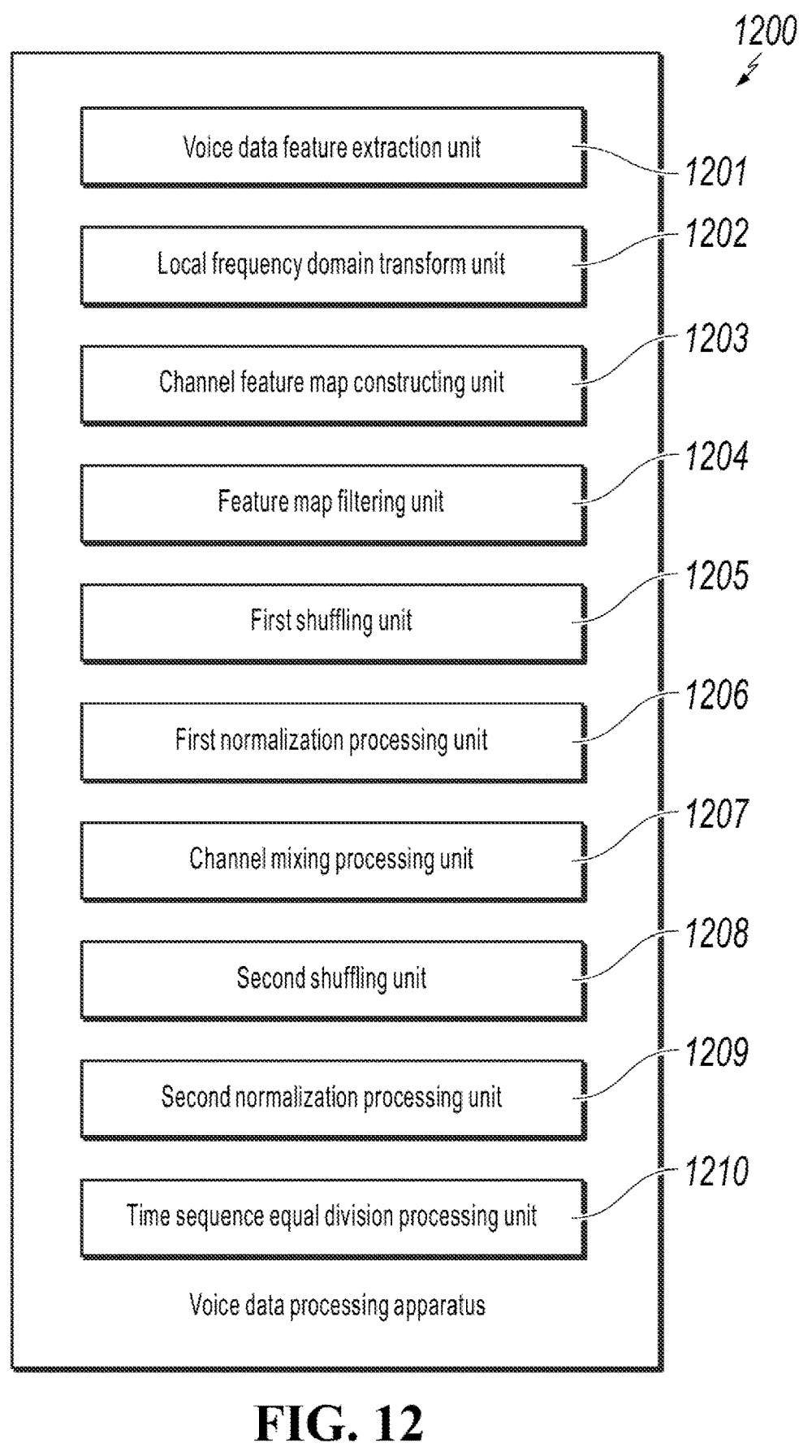

1200

| Voice data feature extraction unit | — 1201 |

| Local frequency domain transform unit | — 1202 |

| Channel feature map constructing unit | — 1203 |

| Feature map filtering unit | — 1204 |

| First shuffling unit | — 1205 |

| First normalization processing unit | — 1206 |

| Channel mixing processing unit | — 1207 |

| Second shuffling unit | — 1208 |

| Second normalization processing unit | — 1209 |

| Time sequence equal division processing unit | — 1210 |

Voice data processing apparatus

FIG. 12

VOICE DATA PROCESSING METHODS AND APPARATUSES, AND VOICE INTENTION UNDERSTANDING METHODS AND SYSTEMS

CROSS-REFERENCE TO RELATED APPLICATIONS

This application claims priority to Chinese Patent Application No. 202211215274.3, filed on Sep. 30, 2022, which is hereby incorporated by reference in its entirety.

TECHNICAL FIELD

Some embodiments of this specification generally relate to the field of artificial intelligence technologies, and in particular, to voice data processing methods and apparatuses for voice intention understanding, and voice intention understanding methods and systems based on desensitized voice data.

BACKGROUND

With development of artificial intelligence technologies, automatic voice control is increasingly applied to various application scenarios, especially an autonomous driving scenario. For example, a vehicle owner uses a voice to control autonomous driving of a vehicle and running of in-vehicle devices. During autonomous driving, the vehicle owner performs voice interaction with the in-vehicle devices. After receiving a voice signal, the in-vehicle device performs voice intention understanding to acquire a running control command of the vehicle owner, and controls running of the in-vehicle device by using the running control command, for example, in-vehicle intelligent terminal control such as navigation and in-vehicle air conditioning.

During autonomous driving, when the vehicle owner performs voice interaction with the in-vehicle device, voice data need to be recorded at any time, and the recorded original voice data are uploaded to a cloud for voice intention determining. In such case, information such as chat content of the vehicle owner is exposed to the cloud. A malicious attacker can steal the chat content of the vehicle owner from the cloud, and acquire voiceprint information representing a personal identity. Then, the malicious attacker can forge and synthesize speech content of a person based on voiceprint information of the person, seriously violating personal privacy of a user. Therefore, during voice intention understanding, desensitization processing needs to be performed on the original voice data such that desensitized voice data are available only for an intention understanding task, and are unavailable for tasks such as automatic speech recognition (ASR) and voiceprint recognition (IR).

SUMMARY

In view of the above-mentioned description, some embodiments of this specification provide voice data processing methods and apparatuses for voice intention understanding, and voice intention understanding methods and apparatuses based on desensitized voice data. According to the voice data processing methods and apparatuses, local frequency domain transform processing is performed on feature data of extracted voice data, and a frequency component channel feature map corresponding to each frequency is constructed based on a local frequency domain transform result. Then, desensitized feature data of the voice data are obtained by selecting, from the constructed frequency component channel feature maps, a target overclocking component channel feature map that is critical to voice intention understanding but not critical to voice signal recognition. As such, the desensitized feature data do not include distinguishable information (for example, high frequency information) in a voice signal, and therefore the obtained desensitized feature data are unavailable for voice content recognition or voiceprint recognition, thereby implementing user privacy protection.

According to an aspect of some embodiments of this specification, a voice data processing method for voice intention understanding is provided, including: performing voice data feature extraction on voice data to obtain first feature data; performing local frequency domain transform processing on the first feature data to obtain at least one feature map, where each feature map includes a plurality of elements and corresponds to one data block in the first feature data, and each element corresponds to one frequency in frequency domain; separately using an element corresponding to each frequency in the at least one feature map to construct a frequency component channel feature map corresponding to each frequency; and selecting at least one target frequency component channel feature map from the constructed frequency component channel feature maps to obtain desensitized feature data of the voice data, where the selected target frequency component channel feature map is a critical channel feature for voice intention understanding and is a non-critical channel feature for voice signal recognition.

Optionally, in some examples of the above-mentioned aspect, after the selecting at least one target frequency component channel feature map from the constructed frequency component channel feature maps, the voice data processing method can further include: performing first shuffling processing on the target frequency component channel feature map to obtain a first shuffling feature map; and performing normalization processing on the first shuffling feature map to obtain the desensitized feature data of the voice data.

Optionally, in some examples of the above-mentioned aspect, the voice data feature extraction includes Fbank-based voice data feature extraction.

Optionally, in some examples of the above-mentioned aspect, the local frequency domain transform processing includes at least one of the following transform processing: a local discrete cosine transform, a local wavelet transform, and a local discrete Fourier transform.

Optionally, in some examples of the above-mentioned aspect, the selecting at least one target frequency component channel feature map from the constructed frequency component channel feature maps can include: selecting the at least one target frequency component channel feature map from the constructed frequency component channel feature maps based on channel importance or a predetermined filtering rule.

Optionally, in some examples of the above-mentioned aspect, the channel importance is determined based on an SEnet network.

Optionally, in some examples of the above-mentioned aspect, the predetermined filtering rule includes: retaining a predetermined quantity of low frequency component channel feature maps in ascending order of frequencies.

Optionally, in some examples of the above-mentioned aspect, after the performing normalization processing on the first shuffling feature map, the voice data processing method can further include: performing channel mixing processing on the normalized first shuffling feature map; performing second shuffling processing on the channel-mixed first shuffling feature map to obtain a second shuffling feature map; and performing normalization processing on the second shuffling feature map to obtain the desensitized feature data of the voice data.

Optionally, in some examples of the above-mentioned aspect, a quantity of the target overclocking component channel feature maps is a feature dimension of the first feature data plus one; and the performing channel mixing processing on the first shuffling feature map includes: performing channel mixing on two adjacent overclocking component channel feature maps in the first shuffling feature map.

Optionally, in some examples of the above-mentioned aspect, the first shuffling processing includes pseudo-random shuffling processing, and the second shuffling processing includes completely random shuffling processing.

Optionally, in some examples of the above-mentioned aspect, a normalization coefficient in normalization processing for each frequency component channel feature map is determined based on a corresponding frequency component channel feature map.

Optionally, in some examples of the above-mentioned aspect, the voice data processing method can further include: equally dividing the normalized second shuffling feature map in a time sequence direction; and randomly shuffling and then re-concatenating the equally divided second shuffling feature map to obtain the desensitized feature data of the voice data.

According to another aspect of some embodiments of this specification, a voice intention understanding method is provided, including: acquiring to-be-recognized voice data; performing desensitization processing on the voice data by using the above-mentioned voice data processing method to obtain desensitized feature data of the voice data; and providing the desensitized feature data to a voice intention understanding model to determine a voice intention of the voice data.

According to another aspect of some embodiments of this specification, a voice data processing apparatus for voice intention understanding is provided, including: a voice data feature extraction unit, configured to perform voice data feature extraction on voice data to obtain first feature data; a local frequency domain transform unit, configured to perform local frequency domain transform processing on the first feature data to obtain at least one feature map, where each feature map includes a plurality of elements and corresponds to one data block in the first feature data, and each element corresponds to one frequency in frequency domain; a channel feature map constructing unit, configured to separately use an element corresponding to each frequency in the at least one feature map to construct a frequency component channel feature map corresponding to each frequency; and a feature map filtering unit, configured to select at least one target frequency component channel feature map from the constructed frequency component channel feature maps to obtain desensitized feature data of the voice data, where the selected target frequency component channel feature map is a critical channel feature for voice intention understanding and is a non-critical channel feature for voice signal recognition.

Optionally, in some examples of the above-mentioned aspect, the voice data processing apparatus can further include: a first shuffling unit, configured to perform first shuffling processing on the target frequency component channel feature map to obtain a first shuffling feature map;

and a first normalization processing unit, configured to perform normalization processing on the first shuffling feature map to obtain the desensitized feature data of the voice data.

Optionally, in some examples of the above-mentioned aspect, the feature map filtering unit selects the at least one target frequency component channel feature map from the constructed frequency component channel feature maps based on channel importance or a predetermined filtering rule.

Optionally, in some examples of the above-mentioned aspect, the voice data processing apparatus can further include: a channel mixing processing unit, configured to perform channel mixing processing on the normalized first shuffling feature map; a second shuffling unit, configured to perform second shuffling processing on the channel-mixed first shuffling feature map to obtain a second shuffling feature map; and a second normalization processing unit, configured to perform normalization processing on the second shuffling feature map to obtain the desensitized feature data of the voice data.

Optionally, in some examples of the above-mentioned aspect, the voice data processing apparatus can further include: a time sequence equal division processing unit, configured to equally divide the normalized second shuffling feature map in a time sequence direction; and randomly shuffle and then re-concatenate the equally divided second shuffling feature map to obtain the desensitized feature data of the voice data.

According to another aspect of some embodiments of this specification, a voice intention understanding system is provided, including: a voice data acquisition apparatus, configured to acquire to-be-recognized voice data; a voice data processing apparatus, configured to perform desensitization processing on the voice data by using the above-mentioned voice data processing method to obtain desensitized feature data of the voice data; and a voice intention understanding apparatus, configured to provide the desensitized feature data to a voice intention understanding model to determine a voice intention of the voice data.

According to another aspect of some embodiments of this specification, a voice data processing apparatus for voice intention understanding is provided, including: at least one processor; a memory coupled to the at least one processor; and a computer program stored in the memory, where the at least one processor executes the computer program to implement the above-mentioned voice data processing method for voice intention understanding.

According to another aspect of some embodiments of this specification, a voice intention understanding system is provided, including: at least one processor; a memory coupled to the at least one processor; and a computer program stored in the memory, where the at least one processor executes the computer program to implement the above-mentioned voice intention understanding method.

According to another aspect of some embodiments of this specification, a computer-readable storage medium is provided, where the computer-readable storage medium stores an executable instruction, and when being executed, the instruction enables the processor to perform the above-mentioned voice data processing method for voice intention understanding, or perform the above-mentioned voice intention understanding method.

According to another aspect of some embodiments of this specification, a computer program product is provided, including a computer program, where the computer program is executed by a processor to implement the above-mentioned voice data processing method for voice intention understanding, or perform the above-mentioned voice intention understanding method.

BRIEF DESCRIPTION OF DRAWINGS

The essence and advantages of this specification can be further understood with reference to the following accompanying drawings. In the accompanying drawings, similar components or features can have the same reference numerals.

FIG. 2 is an example flowchart illustrating a voice data processing method, according to some embodiments of this specification;

FIG. 6 is an example schematic diagram illustrating a frequency component channel feature map, according to some embodiments of this specification;

FIG. 7 is an example flowchart illustrating a voice data processing method, according to some other embodiments of this specification;

FIG. 8 is an example flowchart illustrating an equally divided shuffling process, according to some embodiments of this specification;

FIG. 10 is an example flowchart illustrating a voice intention understanding method, according to some embodiments of this specification;

FIG. 12 is an example block diagram illustrating a voice data processing apparatus, according to some other embodiments of this specification;

DESCRIPTION OF EMBODIMENTS

Figure 1:
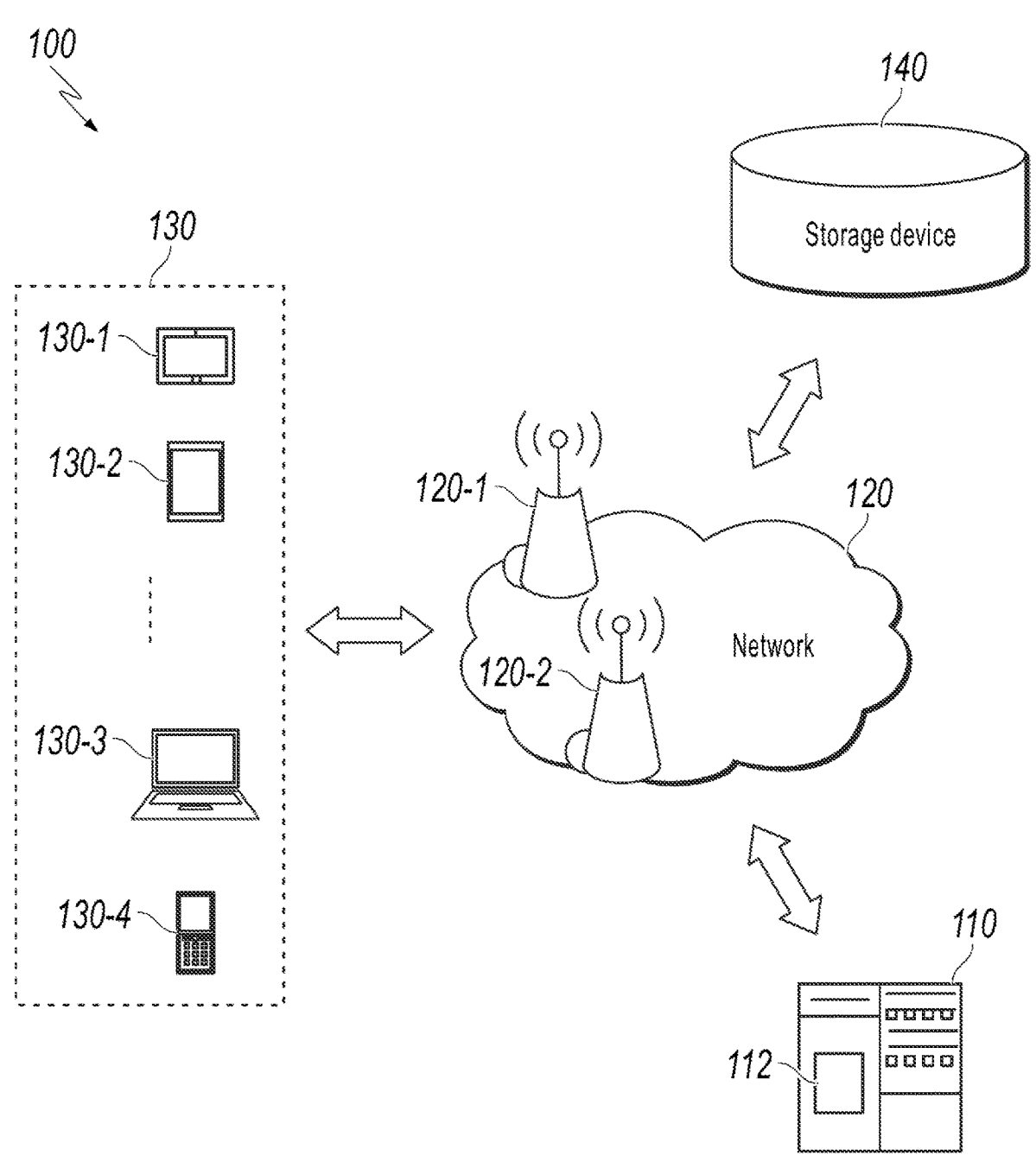
FIG. 1 is an example schematic diagram illustrating an application scenario of a voice data processing system, according to some embodiments of this specification.

The subject matters described in this specification are discussed below with reference to some example implementations. It should be understood that the discussion of these implementations is merely intended to enable a person skilled in the art to better understand the subject matters described in this specification, and is not intended to limit the protection scope, applicability, or examples described in the claims. The functions and arrangements of the elements under discussion can be changed without departing from the protection scope of this specification. Various processes or components can be omitted, replaced, or added in various examples as needed. For example, the described method can be performed in a sequence different from the described sequence, and the steps can be added, omitted, or combined. In addition, the features described in some examples can also be combined in other examples.

As used in this specification, the term "include" and variants thereof represent an open term, which means "including but not limited to". The term "based on" represents "at least partially based on". The term "some embodiments" represents "at least one embodiment". The term "some other embodiments" represents "at least one other embodiment". The terms "first", "second", etc. can refer to different or identical objects. Other definitions, whether explicit or implicit, can be included below. Unless expressly specified in the context, the definition of a term is consistent throughout the specification.

With development of artificial intelligence technologies, automatic voice control is increasingly applied to various application scenarios, especially an autonomous driving scenario. For example, a vehicle owner uses a voice to control autonomous driving of a vehicle and running of an in-vehicle device. However, during autonomous driving, when the vehicle owner performs voice interaction with the in-vehicle device, voice data need to be recorded at any time, and the recorded original voice data are uploaded to a cloud for voice intention determining. In such case, information such as chat content of the vehicle owner is exposed to the cloud. A malicious attacker can steal the chat content of the vehicle owner from the cloud, and acquire voiceprint information representing a personal identity. Then, the malicious attacker can forge and synthesize speech content of a person based on voiceprint information of the person, seriously violating personal privacy of a user. To avoid user privacy exposure, during voice intention understanding, desensitization processing needs to be performed on the original voice data.

In view of the above-mentioned description, some embodiments of this specification provide voice data processing methods and apparatuses for voice intention understanding, and voice intention understanding methods and apparatuses based on desensitized voice data. According to the voice data processing methods and apparatuses, local frequency domain transform processing is performed on feature data of extracted voice data, and a frequency component channel feature map corresponding to each frequency is constructed based on a local frequency domain transform result. Then, desensitized feature data of the voice data are obtained by selecting, from the frequency component channel feature maps, a target overclocking component channel feature map that is critical to voice intention understanding but not critical to voice signal recognition. As such, the desensitized feature data do not include distinguishable information in a voice signal, and therefore the obtained desensitized feature data are unavailable for voice content recognition or voiceprint recognition, thereby implementing user privacy protection.

The voice data processing methods and apparatuses, and the voice intention understanding methods and systems according to some embodiments of this specification are described below with reference to the accompanying drawings.

FIG. 1 is an example schematic diagram illustrating an application scenario of a voice data processing system 100, according to some embodiments of this specification.

As shown in FIG. 1, in the application scenario, the voice data processing system 100 can include a server 110, a network 120, a terminal device 130, and a storage device 140.

The voice data processing system 100 can be widely applied to various scenarios in which voice intention understanding needs to be performed, for example, various automatic voice control scenarios such as voice intention recognition during autonomous driving. The method disclosed in this specification is implemented to perform desensitization processing on the voice data. As such, subsequent voice intention understanding can be completed based on the desensitized voice data, and subsequent vehicle control can be performed based on the determined voice intention. Since the desensitized voice data are hardly applied to automatic speech recognition and voiceprint recognition, original voice content cannot be restored using the automatic speech recognition technology, and voiceprint information of a user cannot be determined using the voiceprint recognition technology, thereby effectively protecting privacy information in the voice data against leakage.

In some typical application scenarios, the terminal device 130 can collect, by using a voice collection device, a voice control signal (voice data) sent by the vehicle owner. In some embodiments, the terminal device 130 can include the voice data processing apparatus according to some embodiments of this specification. The voice data processing apparatus can perform desensitization processing on the collected voice data by implementing the voice data processing method provided in some embodiments of this specification, so as to obtain desensitized voice data. Then, the terminal device 130 sends the desensitized voice data to the server 110 through the network 120. A voice intention understanding model is deployed in the server 110. The voice intention understanding model can be pre-trained by using desensitized voice data (for example, historical desensitized voice data) as training data. After receiving the desensitized voice data sent by the terminal device 130, the server 110 can perform voice intention prediction based on the desensitized voice data by using a voice intention understanding model, and return a predicted voice intention to the terminal device 130. The terminal device 130 completes corresponding control processing based on the received voice intention. In some embodiments, the voice data processing apparatus can also be deployed in the server 110. In such case, the terminal device 130 can be integrated with the server 110. In other words, the voice intention understanding model can be integrated into the terminal device 130.

In some embodiments, the server 110 can be a local server or a remote server. For example, the server 110 can locally connect to the terminal device 130 to acquire information and/or data sent by the terminal device 130. For another example, the server 110 can remotely receive, through the network 120, information and/or data sent by the terminal device 130. In some embodiments, the server 110 can be implemented on a cloud platform. By way of example only, the cloud platform can include a private cloud, a public cloud, a hybrid cloud, a community cloud, a distributed cloud, an internal cloud, a multi-tier cloud, etc., or any combination thereof.

The network 120 can facilitate the exchange of information and/or data. In some embodiments, one or more components of the voice data processing system 100 (e.g., the server 110, the terminal device 130, and the storage device 140) can transmit information to other components of the voice data processing system 100 through the network 120. For example, the terminal device 130 can send the desensitized voice data of the to-be-recognized voice data to the server 120 through the network 120. For another example, the server 110 can return the voice intention predicted based on the desensitized voice data to the terminal device 130, or send the voice intention to the storage device 140 for storage. In some embodiments, the network 120 can be any form of wired or wireless network, or any combination thereof. By way of example only, the network 120 can be one or a combination of a wired network, an optical network, a telecommunication network, an internal network, an internet, a local area network (LAN), a wide area network (WAN), a wireless local area network (WLAN), a metropolitan area network (MAN), a wide area network (WAN), a public switched telephone network (PSTN), a Bluetooth network, etc.

The terminal device 130 can be configured to process information and/or data associated with voice control to perform one or more functions disclosed in this specification. In some embodiments, the terminal device 130 can be any type of device configured to provide a voice control service, such as an in-vehicle device in an autonomously driving vehicle, a robot device, an Internet of Things device (IoT device), etc. After determining a voice intention based on a voice control signal sent by the user, the terminal device 130 can provide a control service corresponding to the voice intention, or execute a control task corresponding to the voice intention. In some embodiments, the terminal device 130 can be configured to acquire to-be-processed voice data collected since a voice collection apparatus is triggered. In some embodiments, the terminal device 130 can perform desensitization processing on the to-be-processed voice data to obtain desensitized voice data used to represent the to-be-processed voice data. In some embodiments, a trusted execution environment can be deployed on the terminal device 130, and the terminal device 130 can perform voice data collection and voice data desensitization processing in the trusted execution environment. In some embodiments, the terminal device 130 can include one or more processing engines (e.g., a single-core processing engine or a multi-core processor). By way of example only, the processing engine can include one or a combination of a central processing unit (CPU), an application-specific integrated circuit (ASIC), an application-specific instruction set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction set computer (RISC), a microprocessor, etc.

In some embodiments, the terminal device 130 can alternatively be a portable device with data acquisition, storage, and/or sending functions, such as a tablet computer 130-2, a notebook computer 130-3, a smartphone 130-4, a camera, or any combination thereof. In some embodiments, the terminal device 130 can exchange data with the server 110 through a network. For example, the terminal device 130 can transmit, to the server 110, desensitized voice data obtained after desensitization processing is performed on the to-be-processed voice data.

The storage device 140 can store data and/or instructions related to voice data processing. In some embodiments, the storage device 140 can store data obtained/acquired by the terminal device 130 and/or the server 110. In some embodiments, the storage device 140 can store data and/or instructions executed or used by the server 110 to complete the example methods described in this specification. In some embodiments, the storage device 140 can include a large-capacity memory, a removable memory, a volatile read-write memory, a read-only memory (ROM), etc., or any combination thereof. Example large-capacity memories can include a magnetic disk, an optical disc, a solid state disk, etc. Example removable memories can include a flash drive, a floppy disk, an optical disc, a storage card, a compact disc, a magnetic tape, etc. Example volatile read-only memories can include a random access memory (RAM). Example RAMs can include a dynamic RAM (DRAM), a double data rate synchronous dynamic RAM (DDRSDRAM), a static RAM (SRAM), a thyristor RAM (T-RAM), a zero capacitor RAM (Z-RAM), etc. Example ROMs can include a mask ROM (MROM), a programmable ROM (PROM), an erasable programmable ROM (PEROM), an electrically erasable programmable ROM (EEPROM), a compact disc ROM (CD-ROM), a digital versatile disc ROM, etc. In some embodiments, the storage device 140 can be implemented on a cloud platform. By way of example only, the cloud platform can include a private cloud, a public cloud, a hybrid cloud, a community cloud, a distributed cloud, an internal cloud, a multi-tier cloud, etc., or any combination thereof.

In some embodiments, the storage device 140 can be connected to the network 120 to communicate with one or more components (e.g., the server 110 and the terminal device 130) in the voice data processing system 100. One or more components in the voice data processing system 100 can access, through the network 120, data or instructions stored in the storage device 140. In some embodiments, the storage device 140 can directly connect to or communicate with one or more components (e.g., the server 110 and the terminal device 130) in the voice data processing system 100. In some embodiments, the storage device 140 can be a part of the server 110 or the terminal device 130.

FIG. 2 is an example flowchart illustrating a voice data processing method 200, according to some embodiments of this specification. In some embodiments, the voice data processing method 200 can be performed by a processing device such as the terminal device 130 or the server 110. For example, the voice data processing method 200 can be stored in a storage apparatus (such as a storage unit built in the processing device or an external storage device) in a form of a program or an instruction, and the program or the instruction can be executed to implement the voice data processing method 200.

As shown in FIG. 2, at 210, voice data feature extraction is performed on voice data to obtain first feature data.

The voice data are non-desensitized voice data for which intention recognition is to be performed. The voice data for which intention recognition is to be performed can be original voice data, i.e., original voice data of a user collected by using a language collection device in the terminal device 130, or can be voice data obtained after preprocessing is performed on the original voice data. For example, the preprocessing can include but is not limited to noise removal processing, invalid information removal processing, etc.

In some embodiments, the processing device can acquire, by using the voice collection device of the terminal device, the voice data for which intention recognition is to be performed, or can acquire, through reading from a database or a storage device or through invoking of a data interface, the voice data for which intention recognition is to be performed.

It is worthwhile to note that, a data acquisition process of the voice data for which intention recognition is to be performed (for example, a program/code used to acquire the voice data for which intention recognition is to be performed) can be completed in the trusted execution environment deployed in the processing device, and a security feature of the feasible execution environment can be used to ensure that the voice data acquired by the processing device are not leaked. In addition, the method and/or the process disclosed in some embodiments of this specification can also be performed in the trusted execution environment so as to ensure that an entire process of voice data processing is secure and credible, thereby improving security of privacy protection for the voice data for which intention recognition is to be performed.

In some embodiments, Fbank-based voice data feature extraction can be performed on the voice data, and the extracted first feature data include Fbank feature data. In some embodiments, voice data feature extraction can alternatively be performed using another appropriate feature extraction method in the field, for example, MFCC-based voice data feature extraction.

Figure 3:
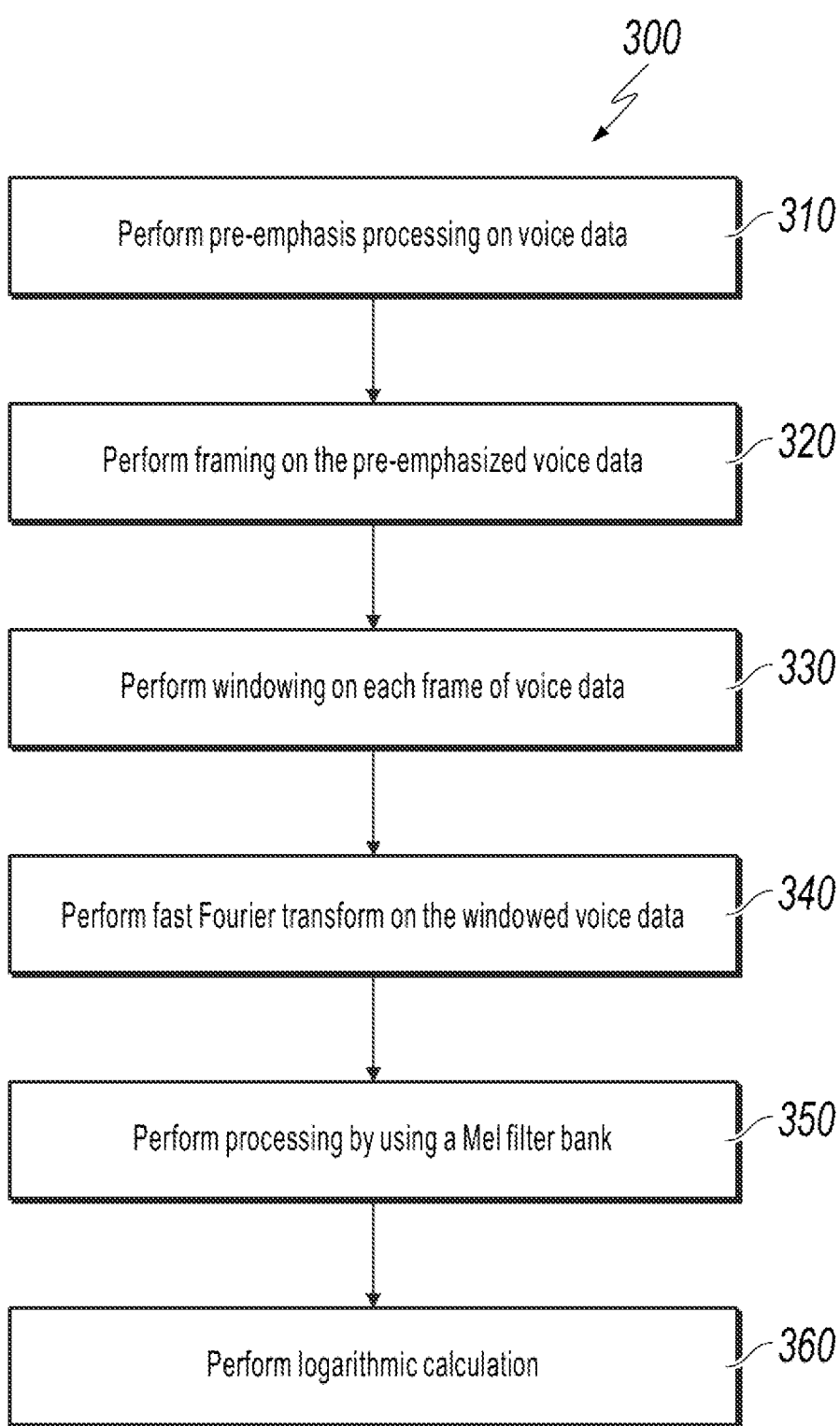
FIG. 3 is an example flowchart illustrating an Fbank-based voice data feature extraction process, according to some embodiments of this specification.

FIG. 3 is an example flowchart illustrating an Fbank-based voice data feature extraction process 300, according to some embodiments of this specification.

310: Perform pre-emphasis processing on voice data. Pre-emphasis processing is to enhance a high-frequency part of a voice signal by using a high-pass filter, and ensure that the same signal-to-noise ratio can be used to obtain a spectrum in an entire frequency band from a low frequency to a high frequency. For example, a transfer function of the used high-pass filter can be shown as follows: $y(n)=x(n)-a*x(n-1)$, where a represents a pre-emphasis coefficient, and a value of a is generally selected as 0.97. A purpose of the pre-emphasis processing is to eliminate effects of vocal cords and lips in a sound-producing process to compensate for a high-frequency part of the voice signal suppressed by a sound-producing system, and to highlight a high-frequency formant.

320: Perform framing processing on the pre-emphasized voice data. Framing means that, given voice data (an audio sample file) are divided based on a specific fixed time length, and each sample obtained after the division is referred to as one frame or sub-frame. The sub-frame obtained after the division is a sample used to analyze and extract an Fbank feature. Here, the sub-frame means first combining N sampling points into one observation unit, i.e., the sub-frame obtained after the division. Generally, a value of N is 512 or 256, which covers a time of approximately 20-30 ms. The value of N and a window interval can alternatively be adjusted based on an actual need. To avoid an excessive change of two adjacent frames, an overlapping area is allowed between two adjacent sub-frames. The overlapping area includes M sampling points, and a value of M is generally approximately ½ or ⅓ of N.

330: Perform windowing processing on each frame of voice data. After framing is performed on the voice data, windowing processing needs to be performed on each sub-frame so as to increase continuity between the left end of the frame and the right end of the frame, thereby reducing spectrum leakage. During extraction of the Fbank feature, a commonly used window function is Hamming window.

340: Perform fast Fourier transform on the windowed voice data. Since it is generally difficult to determine a characteristic of a signal based on transformation of the signal in time domain, the signal is usually converted into energy distribution in frequency domain for observation. Different energy distribution represents different voice characteristics. Therefore, after windowing processing is performed on the voice data, fast Fourier transform (for example, discrete Fourier transform) needs to be further performed to obtain energy distribution on the spectrum. Fast Fourier transform is performed on each frame of voice data with windowed sub-frames to obtain a spectrum of each frame, and modular squaring is performed on the spectrum of the voice data to obtain a power spectrum of the voice data.

350: Perform filtering processing on the obtained energy spectrum by using a Mel filter bank.

The Fbank feature takes into account a human auditory feature. A linear spectrum is first mapped to a Mel nonlinear spectrum based on auditory perception, and then is transformed to a cepstrum. In the Mel frequency domain, a human perception degree of a tone is a linear relationship. For example, if Mel frequencies of two voice segments are two times different, the human ear sounds that tones of the two voice segments are also two times different. The Mel filter is essentially a scale rule. Generally, energy passes through one Mel-scale triangular filter bank. For example, a filter bank including M filters is defined. A filter used is a triangular filter. A center frequency is f(m), m=1, 2, . . . , M, and M is generally 22-26. An interval between f(m) decreases with a decrease of a value of m, and increases with an increase of the value of m.

360: Perform logarithmic calculation on the energy spectrum that is processed by using the Mel filter bank, so as to obtain Fbank feature data.

Referring back to FIG. 2, as described above, after the first feature data are obtained, at 210, local frequency domain transform processing is performed on the first feature data to obtain at least one feature map, where each feature map includes a plurality of elements and corresponds to one data block in the first feature data, and each element corresponds to one frequency in frequency domain.

As described above, after the first feature data are acquired, the acquired first feature data can be used as grayscale image data to perform local frequency domain transform. For example, a time sequence length of the first feature data is used as an image height, and a feature dimension of the first feature data is used as an image width, thereby constructing grayscale image data.

The feature map refers to a plurality of sub-maps that are extracted from to-be-processed grayscale image data by using a specific image processing method, and each sub-map includes some features of the to-be-processed grayscale image data. The obtained feature map can have the same size as the to-be-processed grayscale image, for example, pixels are in a one-to-one correspondence. Alternatively, the obtained feature map can have a different size from the to-be-processed grayscale image data.

In some embodiments, for example, examples of local frequency domain transform processing can include but are not limited to a local discrete cosine transform, a local wavelet transform, or a local discrete Fourier transform.

Figure 4:
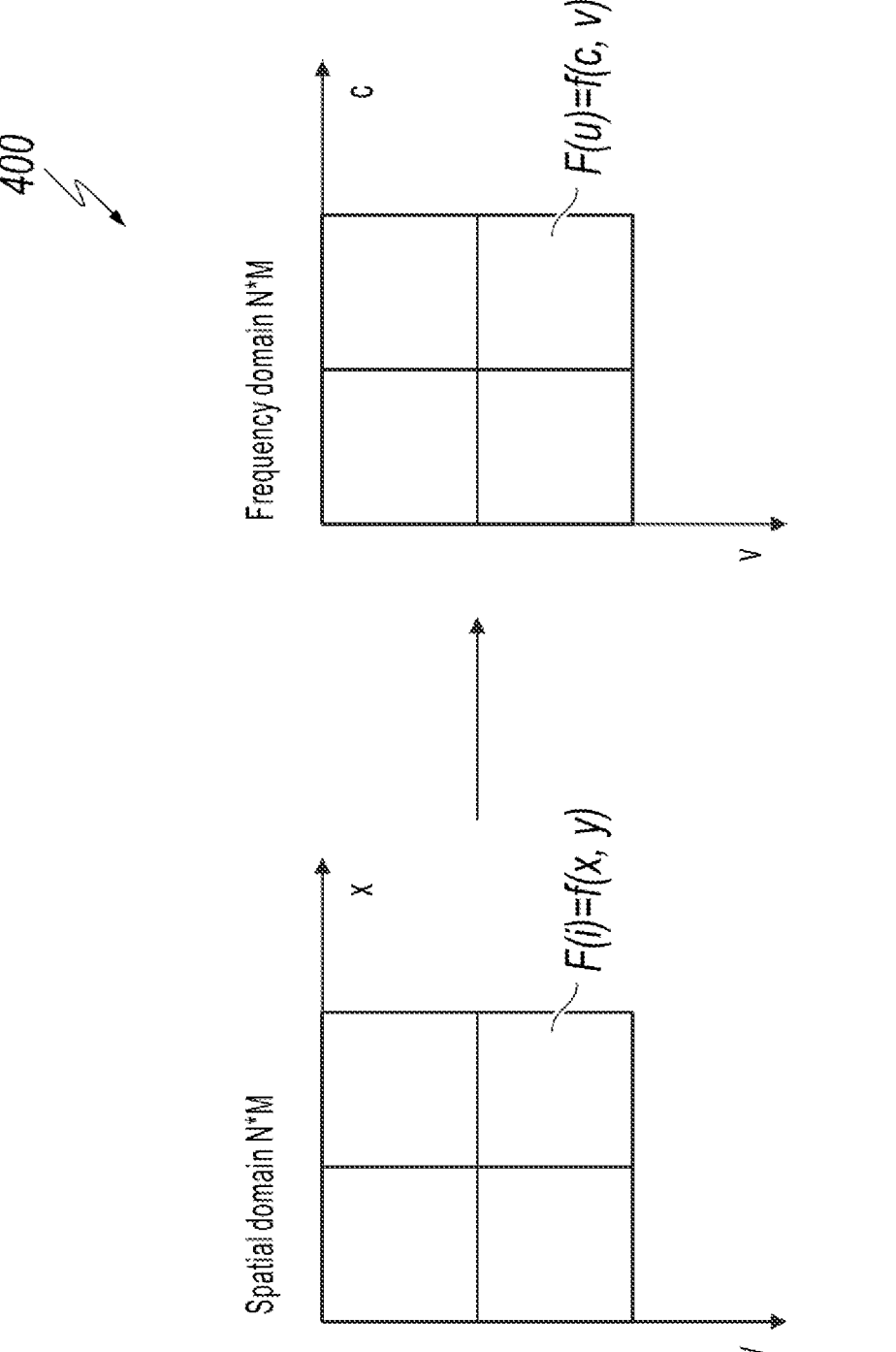
FIG. 4 is an example schematic diagram illustrating transformation of voice feature data from spatial domain to frequency domain, according to some embodiments of this specification.

FIG. 4 is an example schematic diagram illustrating transformation of voice feature data from spatial domain to frequency domain, according to some embodiments of this specification. In FIG. 4, the spatial domain is represented by a coordinate system (x, y), the frequency domain is represented by a coordinate system (c, v), and N*M represents an image size, which is 2*2 in FIG. 4, for example. Quantities of feature points in the spatial domain and the frequency domain after transformation can be consistent. One square block in the spatial domain represents one pixel location, and one square block in the frequency domain represents one frequency location. When the extracted voice feature data are Fbank feature data, x can represent a time sequence length of the Fbank feature data, and y can represent a feature dimension of the Fbank feature data.

In some embodiments, the following discrete cosine transform formula (1) can be used to perform discrete cosine transform on to-be-transformed grayscale image data.

$$F(u, v) = \frac{1}{4} c(u)c(v) \sum_{x=0}^{N-1} \sum_{y=0}^{M-1} f(x, y) \cos\left[\frac{(x + 0.5)\pi}{N} u\right] \cos\left[\frac{(y + 0.5)\pi}{N} v\right] \tag{1}$$

In the formula, F(u, v) represents a value of a feature point (i.e., each frequency location) in the frequency domain after transformation, f(x, y) represents a pixel value in the to-be-transformed grayscale image data, (u, v) represents coordinates of a feature point in the frequency domain after transformation, (x, y) represents coordinates of the to-be-transformed grayscale image data in the spatial domain, N represents a row quantity of pixels or feature points of the to-be-transformed grayscale image data, and M represents a column quantity of pixels or feature points of the to-be-transformed grayscale image data. For example, when a grayscale image size is 8*8, N=M=8.

c(u) can be represented by using the following formula (2).

$$c(u) = \begin{cases} \sqrt{\frac{1}{\sqrt{2}}}, \text{ if } u = 0 \\ 1, u \neq 0 \end{cases} \tag{2}$$

In the formula, c(u)=c(v).

Local frequency domain transform processing can be performed on the first feature data to obtain a plurality of transform results, i.e., a plurality of feature maps. During the local frequency domain transform processing, an image block (a local image block) having a smaller size than the to-be-transformed grayscale image data can be selected. For example, the size of the to-be-transformed grayscale image data is 256×256, and the size of the selected image block is 8×8. Then, mobile sampling is performed on the to-be-transformed grayscale image data by a specific step (for example, 8) based on the size of the selected image block, and discrete cosine transform is performed on local data (for example, a data block with a size of 8×8) of the to-be-transformed grayscale image data obtained by each sampling based on formula (1) and formula (2) to obtain a plurality of transform results. Each transform result can have a size of 8×8. During the discrete cosine transform, a smaller moving step of the image block indicates a larger quantity of features included in the obtained transform result, which can help improve accuracy of subsequent image data processing.

Figure 5:
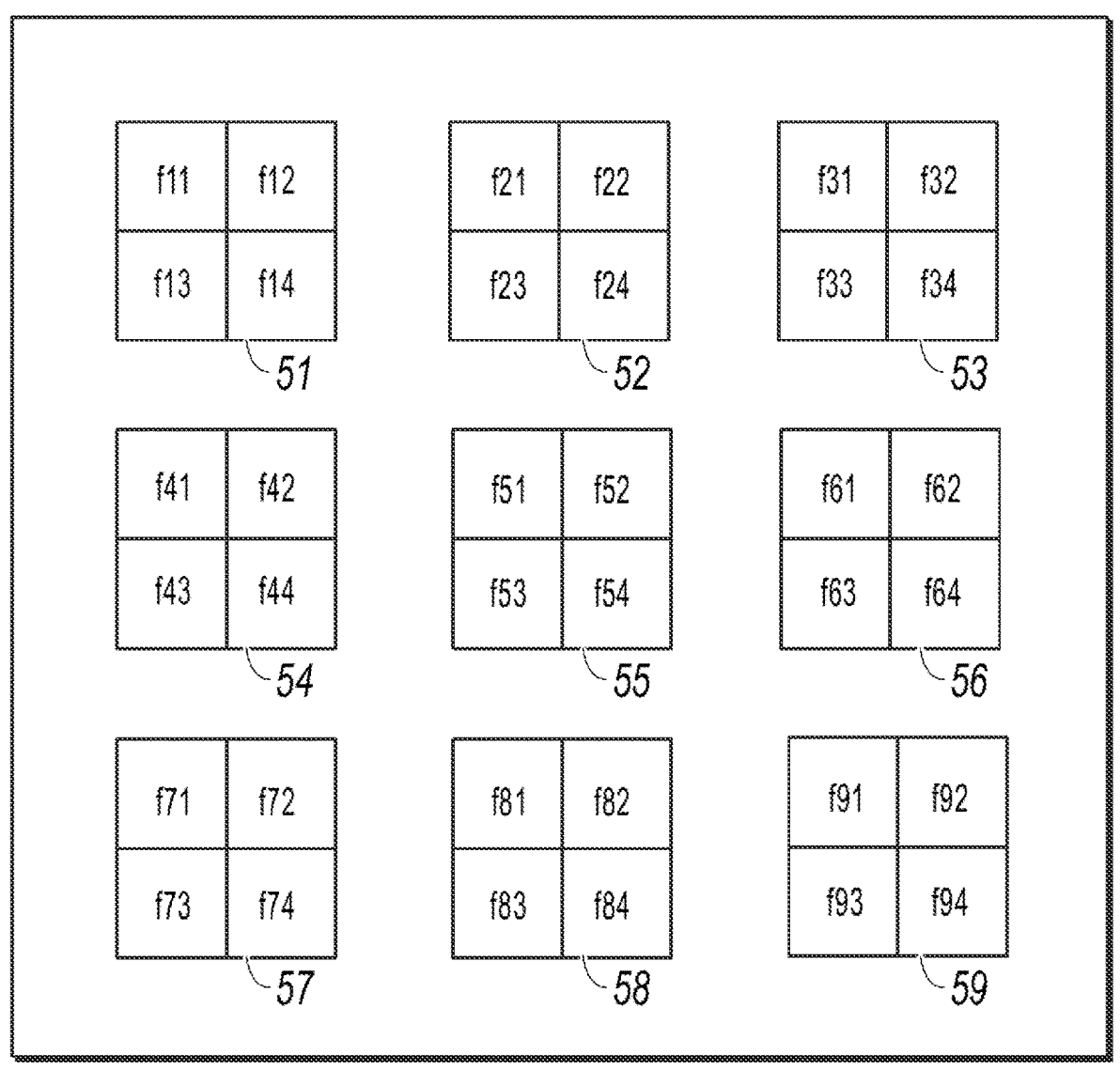
FIG. 5 is an example schematic diagram illustrating a local frequency domain transform process, according to some embodiments of this specification.

FIG. 5 is an example schematic diagram illustrating a local frequency domain transform process, according to some embodiments of this specification. In the example in FIG. 5, the size of the to-be-transformed grayscale image data is 6×6, the size of the selected local image block is 2×2, and mobile sampling is performed on the to-be-transformed grayscale image data by a step of 2. In addition, frequency domain transform such as discrete cosine transform is performed on the sampled local image block to obtain nine transform results, i.e., nine feature maps, which are respectively 51, 52, 53, 54, 55, 56, 57, 58, and 59. Values of frequency locations in each transform result are respectively represented by fi1, fi2, fi3, and fi4, where i represents an $i^{th}$ transform result, and fij represents a value of a $j^{th}$ frequency location in the $i^{th}$ transform result. It can be seen from the figure that each transform result has four corresponding frequency locations.

At 230, an element corresponding to each frequency in the at least one feature map is separately used to construct a frequency component channel feature map corresponding to each frequency. Specifically, elements (values) at identical frequency locations in the transform results are combined to obtain one frequency component channel feature map. As such, a plurality of frequency component channel feature maps at different frequency locations in the corresponding transform results are obtained. It is not difficult to understand that a quantity of frequency component channel feature maps is the same as a quantity of pixels of an image block that is used for sampling in a transform process.

FIG. 6 is an example schematic diagram illustrating a frequency component channel feature map, according to some embodiments of this specification. The frequency component channel feature map shown in FIG. 6 is a frequency component channel feature map corresponding to a transform result in FIG. 5.

As shown in FIG. 6, based on the transform result in FIG. 5, four frequency component channel feature maps (a quantity of pixels of an image block used for sampling is 4) can be obtained, and each frequency component channel feature map includes nine elements. The frequency component channel feature map 61 corresponds to a first frequency location fi1, the frequency component channel feature map 62 corresponds to a second frequency location fi2, the frequency component channel feature map 63 corresponds to a third frequency location fi3, and the frequency component channel feature map 64 corresponds to a fourth frequency location fi4.

It is worthwhile to note that, when the extracted voice feature data are the Fbank feature data, since the Fbank feature data are frequency domain feature data, the transform result is overclocking domain data. Correspondingly, the frequency location in the transform result is an overclocking location, and the frequency component channel feature map is an overclocking component channel feature map.

As described above, after the frequency component channel feature map is constructed, at 240, at least one target frequency component channel feature map is selected from the constructed frequency component channel feature maps. The selected target frequency component channel feature map is a critical channel feature for voice intention understanding and is a non-critical channel feature for voice signal recognition. In other words, the feature information included in the selected target frequency component channel feature map is crucial for voice intention understanding, but is insignificant for voice signal recognition. In other words, the feature information cannot be used to restore voice content or parse out voiceprint information of a user.

In some embodiments, the at least one target frequency component channel feature map can be selected from the constructed frequency component channel feature maps based on channel importance or a predetermined filtering rule.

In some embodiments, the processing device can input a plurality of transform results into a trained SEnet network, and the SEnet network provides channel importance of each feature map (e.g., a score that is positively correlated with the importance). Here, the channel importance is channel importance relative to voice intention understanding. The SEnet network can be obtained through training together (i.e., as a whole) with a voice intention understanding model. For example, the SEnet network is added to the voice intention understanding model, and a parameter of the SEnet network is adjusted in a training process for the voice intention understanding model so as to obtain an SEnet network that is used to determine channel importance of a feature map.

In some embodiments, the predetermined selection rule can include: retaining a predetermined quantity of low frequency component channel feature maps in ascending order of frequencies. For example, a low frequency component is crucial for voice intention understanding, but is insignificant for voice signal recognition. Therefore, a predetermined proportion of some low frequency component channel feature maps can be selectively retained, and remaining high frequency component channel feature maps can be discarded. For example, a proportion of 50%, 60%, or 70% of low frequency feature maps can be retained, and remaining high frequency feature maps can be discarded. For example, the low frequency component feature maps 61, 62, and 63 shown in FIG. 6 are retained, and the high frequency component feature map 64 is discarded. In the transform result obtained after the discrete cosine transform, a value of a frequency location in the upper left corner corresponds to a low frequency component, and a value of a frequency location in the lower right corner corresponds to a high frequency. For example, in the transform result 51 in FIG. 5, f11 corresponds to low frequency data, and f14 corresponds to high frequency data. Referring to the above-mentioned formula (1), when (u, v) is (0, 0), $$\cos\left[\frac{(x+0.5)\pi}{N}u\right]\cos\left[\frac{(y+0.5)\pi}{N}v\right] = 1.$$

F(0,0) does not include an alternating current component, and can be considered as a direct current. Therefore, a frequency corresponding to a value in the upper left corner of the transform result is the lowest. As a coordinate location moves toward the lower right corner, F(u, v) includes an alternating current component, and a frequency increases. Therefore, a frequency corresponding to a value in the lower right corner of the transform result is the highest.

It is worthwhile to note that the direct current component has maximum energy, and the direct current component contributes little to voice intention understanding. However, the component is crucial for voice signal reconstruction. Therefore, during selection of a frequency component channel feature map, a frequency component channel feature map corresponding to the direct current component needs to be removed.

In the example in FIG. 2, the selected at least one target frequency component channel feature map is used as desensitized feature data of the voice data. The desensitized feature data are feature data obtained after desensitization processing is performed on a plurality of feature maps, and can include one or more frequency component channel feature maps obtained after the desensitization processing. The voice data for which intention recognition is to be performed are audio data, whereas the desensitized feature data are a frequency component channel feature map. Therefore, neither original voice data nor voiceprint information of a producer of the voice data can be exported directly based on the desensitized feature data.

According to the voice data processing method shown in FIG. 2, local frequency domain transform processing is performed on feature data of extracted voice data, and a frequency component channel feature map corresponding to each frequency is constructed based on a local frequency domain transform result. Then, desensitized feature data of the voice data are obtained by selecting, from the constructed frequency component channel feature maps, a target overclocking component channel feature map that is critical to voice intention understanding but not critical to voice signal recognition. As such, the desensitized feature data do not include distinguishable information in a voice signal, and therefore the obtained desensitized feature data are unavailable for voice content recognition or voiceprint recognition, thereby implementing user privacy protection.

In the example in FIG. 2, the desensitization processing method includes reconstruction of a frequency component channel feature map for a feature map, and selection of a feature map for a frequency component channel feature map. In other embodiments, in addition to the above-mentioned operations, the desensitization processing method can further include shuffling processing, normalization processing, channel mixing processing, equally divided shuffling and re-concatenation processing, or any combination thereof.

FIG. 7 is an example flowchart illustrating a voice data processing method 700, according to some other embodiments of this specification. The embodiment shown in FIG. 7 is a modified embodiment for the embodiment shown in FIG. 2. Steps 710 to 740 in FIG. 7 are identical to steps 210 to 240 in FIG. 2. For simplicity of description, a same part of content is not described below, but only differences are described.

As shown in FIG. 7, after the target frequency component channel feature map is selected at 740, the selected target frequency component channel feature map is not used as desensitized feature data. Instead, operations of 750 to 780 are further performed to obtain the desensitized feature data.

Specifically, after the at least one target frequency component channel feature map is selected from the constructed frequency component channel feature maps, at 750, first shuffling processing is performed on the selected target frequency component channel feature map to obtain a first shuffling feature map. In addition, normalization processing is performed on the first shuffling feature map. In some embodiments, data obtained after the normalization processing are performed on the first shuffling feature map can be directly used as the desensitized feature data. In some embodiments, subsequent processing needs to be performed on the data obtained after the normalization processing is performed on the first shuffling feature map, so as to obtain the desensitized feature data.

In some embodiments, the first shuffling processing can be performing sequential randomization on the selected target frequency component channel feature map. Sequential randomization means shuffling an arrangement order of a plurality of feature maps. For example, the plurality of selected target frequency component channel feature maps are 61, 62, and 63 in FIG. 6, and an arrangement order after the sequential randomization may be 63, 61, and 62.

In some embodiments, the normalization parameter is a parameter used when normalization processing is performed on a plurality of target frequency component channel feature maps. During normalization processing, a normalization coefficient of each frequency component channel feature map can be determined based on the frequency component channel feature map such that a normalization parameter used when normalization processing is performed on each frequency component channel feature map is related only to the frequency component channel feature map itself, but is unrelated to another frequency component feature map, thereby increasing difficulty in reverse derivation of the voice data. For example, it is assumed that a frequency component channel feature map is derived reversely. However, since the parameter for normalization of each frequency component channel feature map varies, another frequency component channel feature map cannot be derived reversely by using the normalization parameter of the reversely derived frequency component channel map. The above-mentioned normalization processing can also be referred to as self-normalization processing.

In some embodiments, the normalization parameter can be an average value or a variance of all values of the frequency component channel feature map, or can be a maximum or minimum value of all values of the frequency component channel feature map. Normalization processing means that a value of each element in the frequency component channel feature map is divided by a normalization parameter, and a division quotient is used to replace an original value, so as to obtain a normalized frequency component channel feature map.

The above-mentioned first shuffling processing and corresponding normalization processing can ensure that original data of the selected target frequency component channel feature map cannot be obtained, thereby protecting data privacy security of the selected target frequency component channel feature map.

At 760, channel mixing processing is performed on the normalized first shuffling feature map.

The mixing processing can mean performing an operation on two or more of the plurality of frequency component channel feature maps based on a predetermined calculation method. For example, values of corresponding elements in two or more frequency component channel feature maps can be calculated, and a calculated value can be used as a value of a corresponding element in the mixed frequency component channel feature map. As such, two or more frequency component channel feature maps can be mixed into one frequency component channel feature map. The predetermined calculation method can be calculating an average value, a sum, a difference, etc.

In some embodiments, channel mixing can be mixing of two adjacent frequency component channel feature maps. It is worthwhile to note that, during feature map combination, different frequency component channel feature maps should have the same combination rule. For example, starting from the first frequency component channel feature map, the current frequency component channel feature map is combined with its next adjacent frequency component channel feature map. To be specific, the first frequency component channel feature map is combined with the second frequency component channel feature map, and the second frequency component channel feature map is combined with the third frequency component channel feature map. As such, for M frequency component channel feature maps, M−1 frequency component channel feature maps can be obtained, thereby reducing dimensions.

In some embodiments, when two adjacent frequency component channel feature maps are mixed, a quantity of selected target frequency component channel feature maps can be set to be a feature dimension of the first feature data plus one. According to such a processing method, the feature dimension of the obtained desensitized feature data can be the same as the feature dimension of the first feature data such that a model architecture of a voice intention understanding model does not need to be modified.

After channel mixing, a value of each element in the channel-mixed frequency component channel feature map changes in comparison with a value of the frequency component channel feature map before channel mixing, thereby destroying a relative magnitude relationship of values of elements between original frequency component channel feature maps, and further increasing difficulty in reversely deriving original voice data or voiceprint information of the original voice data based on the frequency component channel feature map.

After the above-mentioned channel mixing is performed, at 770, second shuffling processing is performed on the channel-mixed first shuffling feature map to obtain a second shuffling feature map. In addition, normalization processing is performed on the second shuffling feature map. For the second shuffling processing and corresponding normalization processing, references can be made to the description of 750. Details are omitted here for simplicity. In some embodiments, data obtained after the normalization processing are performed on the second shuffling feature map can be directly used as the desensitized feature data. In some embodiments, subsequent processing needs to be performed on the data obtained after the normalization processing is performed on the second shuffling feature map, so as to obtain the desensitized feature data.

At 780, equally divided shuffling processing is performed on the normalized second shuffling feature map. The second shuffling feature map obtained after the equally divided shuffling processing is used as the desensitized feature data.

The above-mentioned second shuffling processing and corresponding normalization processing can ensure that original data of the channel-mixed frequency component channel feature map cannot be obtained, thereby protecting data privacy security of the channel-mixed frequency component channel feature map. It is worthwhile to note that in some embodiments, the first shuffling processing can be pseudo-random shuffling processing, and the second shuffling processing can be completely random shuffling processing.

FIG. 8 is an example flowchart illustrating an equally divided shuffling process 800, according to some embodiments of this specification.

As shown in FIG. 8, at 810, the normalized second shuffling feature map is equally divided in a time sequence direction to obtain equal-length equally divided content.

At 820, the equally divided second shuffling feature map (equally divided content) is randomly shuffled. Then, at 830, the equally divided content that is randomly shuffled is re-concatenated, and the concatenated frequency allocation channel feature map is used as the desensitized feature data of the voice data.

According to the embodiment shown in FIG. 8, desensitization is performed on the voice data for which intention recognition is to be performed, thereby ensuring that a voice intention is determined but original voice data and voiceprint information of the original voice data cannot be restored. As such, privacy protection for the voice data is implemented. The above-mentioned process includes two times of shuffling and normalization processing, thereby greatly increasing difficulty in brute force cracking. For example, local cosine transform is performed on the first feature data based on an 8*8 local image block so as to construct 64 frequency component channel feature maps. In addition, after shuffling processing is performed on the frequency component channel feature map, each small frequency component (one frequency component channel feature map corresponds to one frequency component) in the transform result is randomly placed, and therefore a random brute force cracking space size is 64!, where "!" represents a factorial operation. Even if channel filtering is performed on the frequency component channel feature map based on channel importance to determine, for example, 36 main feature maps, the brute force cracking space is 36!. The desensitization process includes two randomization processes such that the brute force cracking space size is 36!*36!, which is larger than key cracking space of the 256-bit AES encryption algorithm. Therefore, it is difficult to reversely derive the original voice data through brute force cracking. In addition, the normalization parameter depends only on the corresponding frequency component channel feature map, and normalization parameters of different frequency component channel feature maps are different. Therefore, it is more difficult to derive the normalization parameter of each frequency component channel feature map. In addition, channel mixing processing is further performed on the frequency component channel feature map, and only a result obtained after the channel mixing is retained. As such, a relative relationship of values between frequency component channel feature maps is destroyed, thereby further increasing difficulty in data cracking, and enhancing privacy security protection of voice data.

The voice data processing method according to some embodiments of this specification has been described above with reference to FIG. 1 to FIG. 8. The desensitized feature data of the voice data obtained by using the above-mentioned method can be provided to a voice intention understanding model to predict a voice intention of the voice data. The voice intention understanding model can be any appropriate machine learning model, and can be pre-trained by using desensitized voice data (for example, historical desensitized voice data) as training data.

Figure 9:
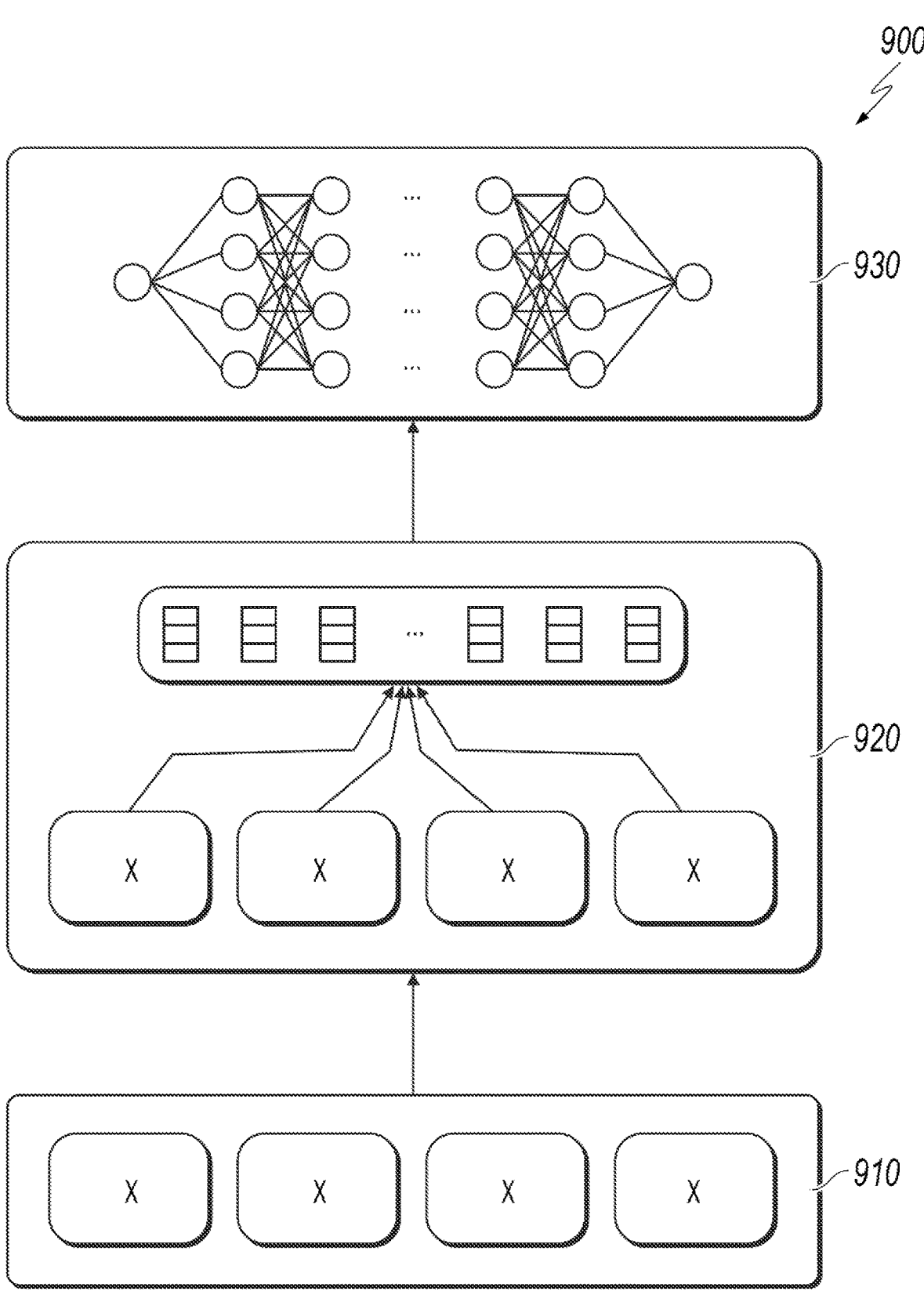
FIG. 9 is an example structural diagram illustrating a voice intention understanding model, according to some embodiments of this specification.

FIG. 9 is an example structural diagram illustrating a voice intention understanding model 900, according to some embodiments of this specification. As shown in FIG. 9, the voice intention understanding model 900 can include an input layer 910, a feature extraction layer 920, and an output layer 930.

The input layer 910 can be configured to receive the desensitized feature data of the voice data obtained after the above-mentioned voice data processing.

In some embodiments, the input layer 910 can have a plurality of input channels, a quantity of the plurality of input channels can be the same as a quantity of frequency component channel feature maps in the desensitized feature data, and each channel corresponds to one frequency component channel feature map.

In some embodiments, a quantity of input channels of an initially created voice intention understanding model can be adjusted, and the quantity of the input channels is the same as a quantity of feature maps obtained through processing by using the above-mentioned image processing method.

In some embodiments, a quantity of selected target frequency component channel feature maps can be set to ensure that a quantity of frequency component channel feature maps in the obtained desensitized feature data is the same as a quantity of channels of an original voice intention understanding model. Therefore, the original voice intention understanding model can be reused without any adjustment.

The feature extraction layer 920 can be configured to process the input desensitized feature data to obtain a feature vector or a prediction vector of the desensitized feature data.

In some embodiments, the feature extraction layer can be a deep neural network such as a CNN or an RNN. The feature extraction layer can process (such as convolution or pooling) each feature map to obtain a more abstract feature vector representation.

The output layer 930 can convert the feature vector into a voice intention prediction result for the desensitized feature data.

The output layer 930 can transform the feature vector of the desensitized feature data to obtain a predicted value, where the predicted value can indicate a voice intention of the voice data.

In some embodiments, the output layer 930 can be a multi-layer perception device, a full connection layer, or the like, which is not limited in some embodiments.

FIG. 10 is an example flowchart illustrating a voice intention understanding method 1000, according to some embodiments of this specification.

As shown in FIG. 10, at 1010, to-be-recognized voice data are acquired. For example, a voice collection device at a terminal device can be used to collect a voice signal sent by a user. Alternatively, the voice signal collected by the voice collection device at the terminal device is acquired through a network or locally.

At 1020, desensitization processing is performed on the acquired voice data by using the above-mentioned voice data processing method, so as to obtain desensitized feature data of the voice data.

At 1030, the obtained desensitized feature data are provided to a voice intention understanding model to determine a voice intention of the voice data.

It is worthwhile to note that the voice intention understanding method 1000 shown in FIG. 10 can be performed by a terminal device or a server. In addition, a voice intention understanding model can be deployed in the terminal device or the server.

In some embodiments, the above-mentioned steps can be performed in a trusted execution environment to ensure that an entire process of voice intention understanding is in a secure and trusted environment, thereby avoiding leakage of original voice data and desensitized feature data.

It is worthwhile to note that descriptions of the above-mentioned processes are merely intended for illustration and description, and are not intended to limit the application scope of some embodiments of this specification. A person skilled in the art can make various amendments and changes to the processes under the guidance of this specification. However, these amendments and changes are still within the scope of some embodiments of this specification. For example, a change can be made to a related procedure step in some embodiments of this specification, such as adding a preprocessing step and a storage step.

Figure 11:
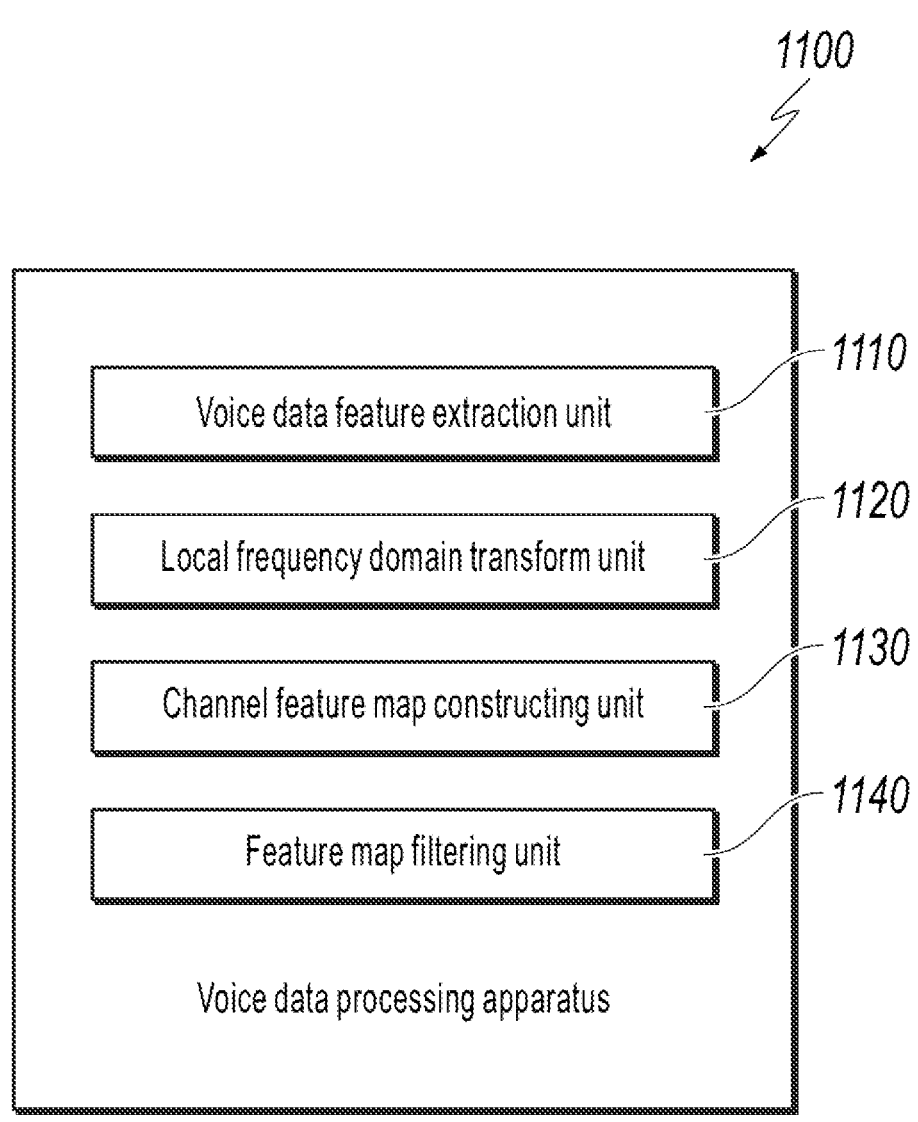
FIG. 11 is an example block diagram illustrating a voice data processing apparatus, according to some embodiments of this specification.

FIG. 11 is an example block diagram illustrating a voice data processing apparatus 1100, according to some embodiments of this specification. As shown in FIG. 11, the voice data processing apparatus 1100 includes a voice data feature extraction unit 1110, a local frequency domain transform unit 1120, a channel feature map constructing unit 1130, and a feature map filtering unit 1140.

The voice data feature extraction unit 1110 is configured to perform voice data feature extraction on voice data to obtain first feature data. For an operation of the voice data feature extraction unit 1110, references can be made to the operation described above with reference to 210 in FIG. 2.

The local frequency domain transform unit 1120 is configured to perform local frequency domain transform processing on the first feature data to obtain at least one feature map, where each feature map includes a plurality of elements and corresponds to one data block in the first feature data, and each element corresponds to one frequency in frequency domain. For an operation of the local frequency domain transform unit 1120, references can be made to the operation described above with reference to 220 in FIG. 2.

The channel feature map constructing unit 1130 is configured to separately use an element corresponding to each frequency in the at least one feature map to construct a frequency component channel feature map corresponding to each frequency. For an operation of the channel feature map constructing unit 1130, references can be made to the operation described above with reference to 230 in FIG. 2.

The feature map filtering unit 1140 is configured to select at least one target frequency component channel feature map from the constructed frequency component channel feature maps to obtain desensitized feature data of the voice data, where the selected target frequency component channel feature map is a critical channel feature for voice intention understanding and is a non-critical channel feature for voice signal recognition. For an operation of the feature map filtering unit 1140, references can be made to the operation described above with reference to 240 in FIG. 2.

FIG. 12 is an example block diagram illustrating a voice data processing apparatus 1200, according to some other embodiments of this specification. As shown in FIG. 12, the voice data processing apparatus 1200 includes a voice data feature extraction unit 1201, a local frequency domain transform unit 1202, a channel feature map constructing unit 1203, a feature map filtering unit 1204, a first shuffling unit 1205, a first normalization processing unit 1206, a channel mixing processing unit 1207, a second shuffling unit 1208, a second normalization processing unit 1209, and a time sequence equal division processing unit 1210.

The voice data feature extraction unit 1201 is configured to perform voice data feature extraction on voice data to obtain first feature data. For an operation of the voice data feature extraction unit 1201, references can be made to the operation described above with reference to 710 in FIG. 7.

The local frequency domain transform unit 1202 is configured to perform local frequency domain transform processing on the first feature data to obtain at least one feature map, where each feature map includes a plurality of elements and corresponds to one data block in the first feature data, and each element corresponds to one frequency in frequency domain. For an operation of the local frequency domain transform unit 1202, references can be made to the operation described above with reference to 720 in FIG. 7.

The channel feature map constructing unit 1203 is configured to separately use an element corresponding to each frequency in the at least one feature map to construct a frequency component channel feature map corresponding to each frequency. For an operation of the channel feature map constructing unit 1203, references can be made to the operation described above with reference to 730 in FIG. 7.

The feature map filtering unit 1204 is configured to select at least one target frequency component channel feature map from the constructed frequency component channel feature maps, where the selected target frequency component channel feature map is a critical channel feature for voice intention understanding and is a non-critical channel feature for voice signal recognition. In some embodiments, the feature map filtering unit 1204 can select the at least one target frequency component channel feature map from the constructed frequency component channel feature maps based on channel importance or a predetermined filtering rule. For an operation of the feature map filtering unit 1204, references can be made to the operation described above with reference to 740 in FIG. 7.

The first shuffling unit 1205 is configured to perform first shuffling processing on the target frequency component channel feature map to obtain a first shuffling feature map. The first normalization processing unit 1206 is configured to perform normalization processing on the first shuffling feature map. For operations of the first shuffling unit 1205 and the first normalization processing unit 1206, references can be made to the operation described above with reference to 750 in FIG. 7.

The channel mixing processing unit 1207 is configured to perform channel mixing processing on the normalized first shuffling feature map. For an operation of the channel mixing processing unit 1207, references can be made to the operation described above with reference to 760 in FIG. 7.

The second shuffling unit 1208 is configured to perform second shuffling processing on the channel-mixed first shuffling feature map to obtain a second shuffling feature map. The second normalization processing unit 1209 is configured to perform normalization processing on the second shuffling feature map. For operations of the first shuffling unit 1208 and the second normalization processing unit 1209, references can be made to the operation described above with reference to 770 in FIG. 7.

The time sequence equal division processing unit 1210 is configured to equally divide the normalized second shuffling feature map in a time sequence direction; and randomly shuffle and then re-concatenate the equally divided second shuffling feature map to obtain the desensitized feature data of the voice data. For an operation of the time sequence equal division processing unit 1210, references can be made to the operation described above with reference to 780 in FIG. 7.

Figure 13:
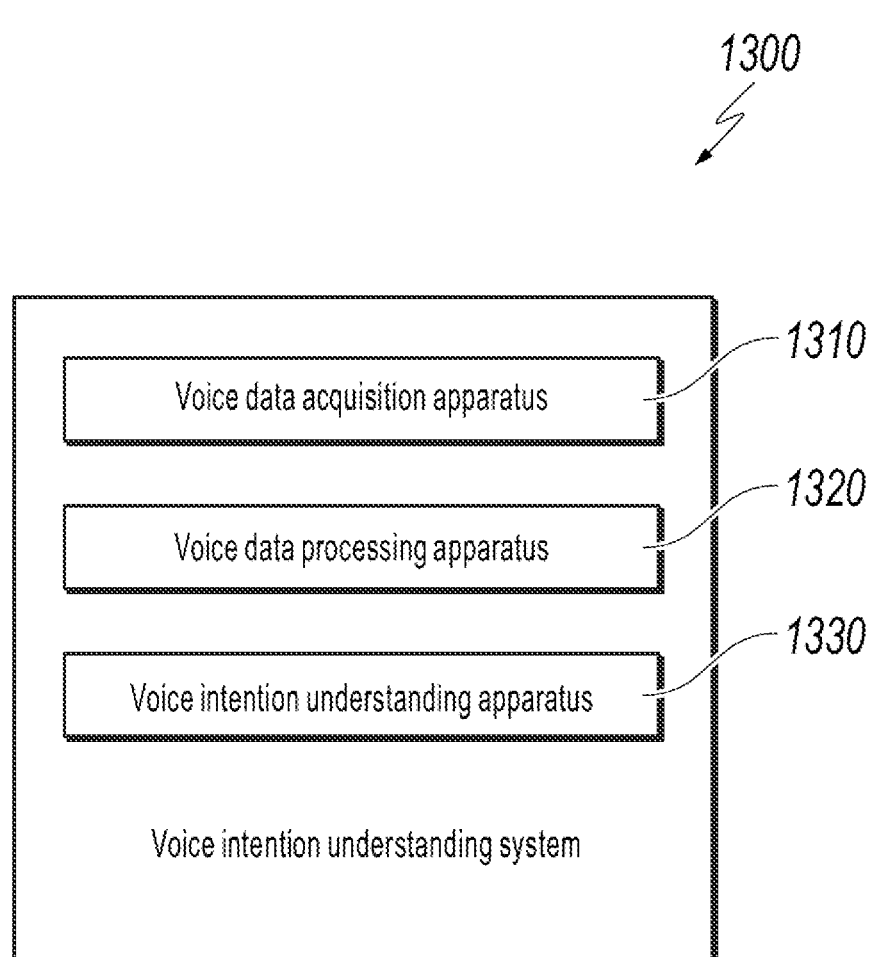
FIG. 13 is an example block diagram illustrating a voice intention understanding system, according to some embodiments of this specification.

FIG. 13 is an example block diagram illustrating a voice intention understanding system 1300, according to some embodiments of this specification. As shown in FIG. 13, the voice intention understanding system 1300 includes a voice data acquisition apparatus 1310, a voice data processing apparatus 1320, and a voice intention understanding apparatus 1330.

The voice data acquisition apparatus 1310 is configured to acquire to-be-recognized voice data. For an operation of the voice data acquisition apparatus 1310, references can be made to the operation described above with reference to 1010 in FIG. 10.

The voice data processing apparatus 1320 is configured to perform desensitization processing on the voice data by using the above-mentioned voice data processing method, to obtain desensitized feature data of the voice data. For an operation of the voice data processing apparatus 1320, references can be made to the operation described above with reference to 1020 in FIG. 10.

The voice intention understanding apparatus 1330 is configured to provide the desensitized feature data to a voice intention understanding model to determine a voice intention of the voice data. For an operation of the voice intention understanding apparatus 1330, references can be made to the operation described above with reference to 1030 in FIG. 10.

The voice data processing methods and apparatuses, and the voice intention understanding methods and systems according to some embodiments of this specification have been described above with reference to FIG. 1 to FIG. 13. The above-mentioned voice data processing apparatus and voice intention understanding system can be implemented by using hardware, or can be implemented by using software or a combination of hardware and software.

Figure 14:
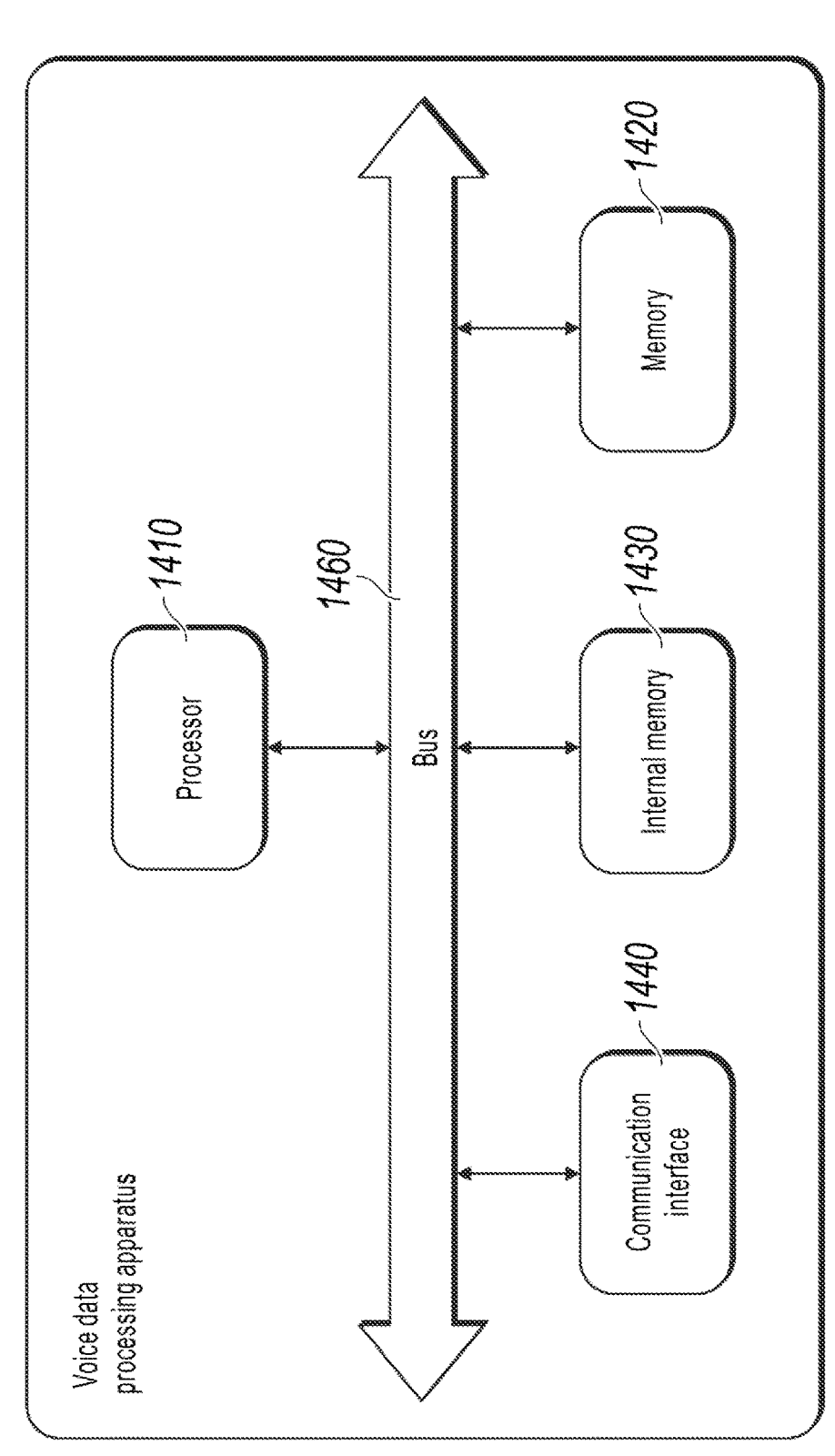
FIG. 14 is an example schematic diagram illustrating a voice data processing apparatus implemented based on a computer system, according to some embodiments of this specification.

FIG. 14 is an example schematic diagram illustrating a voice data processing apparatus 1400 implemented based on a computer system, according to some embodiments of this specification. As shown in FIG. 14, the voice data processing apparatus 1400 can include at least one processor 1410, a memory (for example, a non-volatile memory) 1420, an internal memory 1430, and a communication interface 1440, and the at least one processor 1410, the memory 1420, the internal memory 1430, and the communication interface 1440 are connected together through a bus 1460. The at least one processor 1410 executes at least one computer-readable instruction (namely, the above-mentioned elements implemented in a software form) stored or encoded in the memory.

In some embodiments, a computer-executable instruction is stored in the memory, and when being executed, the computer-executable instruction enables the at least one processor 1410 to perform the following operations: performing voice data feature extraction on voice data to obtain first feature data; performing local frequency domain transform processing on the first feature data to obtain at least one feature map, where each feature map includes a plurality of elements and corresponds to one data block in the first feature data, and each element corresponds to one frequency in frequency domain; separately using an element corresponding to each frequency in the at least one feature map to construct a frequency component channel feature map corresponding to each frequency; and selecting at least one target frequency component channel feature map from the constructed frequency component channel feature maps to obtain desensitized feature data of the voice data, where the selected target frequency component channel feature map is a critical channel feature for voice intention understanding and is a non-critical channel feature for voice signal recognition.

It should be understood that, when being executed, the computer-executable instruction stored in the memory enables the at least one processor 1410 to perform various operations and functions described above with reference to FIG. 1 to FIG. 13 in some embodiments of this specification.

Figure 15:
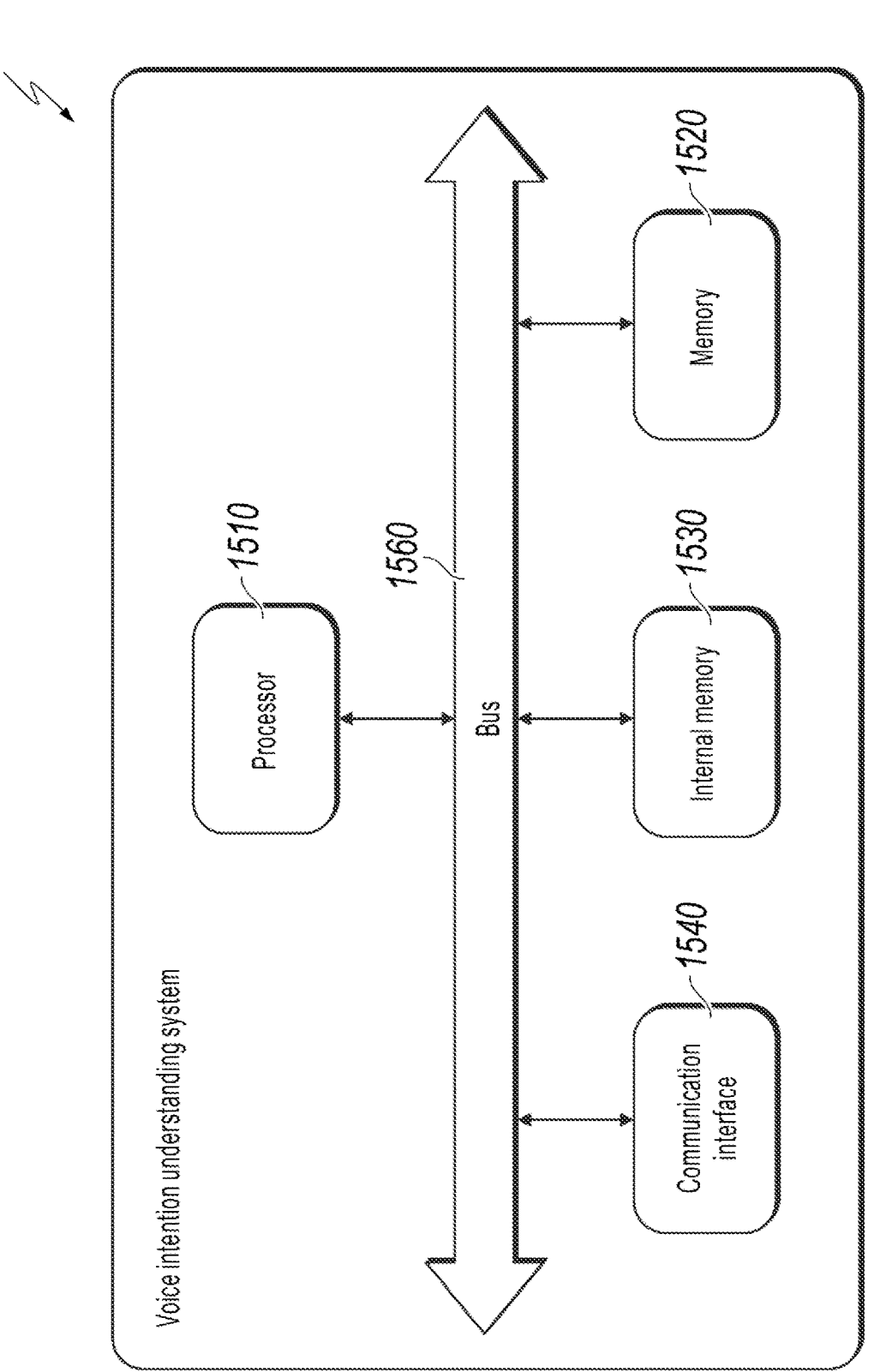
FIG. 15 is an example schematic diagram illustrating a voice intention understanding system implemented based on a computer system, according to some embodiments of this specification.

FIG. 15 is an example schematic diagram illustrating a voice intention understanding system 1500 implemented based on a computer system, according to some embodiments of this specification. As shown in FIG. 15, the voice intention understanding system 1500 can include at least one processor 1510, a memory (for example, a non-volatile memory) 1520, an internal memory 1530, and a communication interface 1540, and the at least one processor 1510, the memory 1520, the internal memory 1530, and the communication interface 1540 are connected together through a bus 1560. The at least one processor 1510 executes at least one computer-readable instruction (namely, the above-mentioned elements implemented in a software form) stored or encoded in the memory.

In some embodiments, a computer-executable instruction is stored in the memory, and when being executed, the computer-executable instruction enables the at least one processor 1510 to perform the following operations: acquiring to-be-recognized voice data; performing desensitization processing on the voice data by using the above-mentioned voice data processing method to obtain desensitized feature data of the voice data; and providing the desensitized feature data to a voice intention understanding model to determine a voice intention of the voice data.

It should be understood that, when being executed, the computer-executable instruction stored in the memory enables the at least one processor 1510 to perform various operations and functions described above with reference to FIG. 1 to FIG. 13 in some embodiments of this specification.

According to some embodiments, a program product such as a machine-readable medium (for example, a non-transitory machine-readable medium) is provided. The machine-readable medium can have an instruction (namely, the above-mentioned elements implemented in a software form). When the instruction is executed by a machine, the machine is enabled to perform the above-mentioned operations and functions described with reference to FIG. 1 to FIG. 13 in some embodiments of this specification. Specifically, a system or an apparatus with a readable storage medium can be provided, the readable storage medium stores software program code for implementing the functions in any one of some embodiments described above, and a computer or a processor of the system or the apparatus is enabled to read and execute the instructions stored in the readable storage medium.

In such case, the program code read from the readable medium can implement the functions in any one of some embodiments described above, and therefore the machine-readable code and the readable storage medium storing the machine-readable code form a part of this application.

Some embodiments of the readable storage medium include a floppy disk, a hard disk, a magneto-optical disk, an optical disc (such as a CD-ROM, a CD-R, a CD-RW, a DVD-ROM, a DVD-RAM, a DVD-RW, and a DVD-RW), a magnetic tape, a non-volatile memory card, and a ROM. Alternatively, the program code can be downloaded from a server computer or a cloud by a communication network.

According to some embodiments, a computer program product is provided, where the computer program product includes a computer program, and when the computer program is executed by a processor, the processor is enabled to perform the operations and functions described above with reference to FIG. 1 to FIG. 13 in some embodiments of this specification.

A person skilled in the art should understand that various variations and modifications can be made to some embodiments disclosed above without departing from the essence of this application. Therefore, the protection scope of this application should be defined by the appended claims.

It is worthwhile to note that, not all the steps and units in the above-mentioned processes and system structure diagrams are necessary, and some steps or units can be ignored based on an actual need. An order of performing the steps is not fixed, and can be determined based on a need. The apparatus structure described in some embodiments can be a physical structure or a logical structure. In other words, some units may be implemented by the same physical entity, or some units may be implemented by a plurality of physical entities, or may be implemented together by some components in a plurality of independent devices.

In some above-mentioned embodiments, a hardware unit or module can be implemented mechanically or electrically. For example, a hardware unit, a module, or a processor can include a permanent dedicated circuit or logic (such as a dedicated processor, FPGA, or ASIC) to complete a corresponding operation. The hardware unit or the processor can further include a programmable logic or circuit (such as a general-purpose processor or another programmable processor), and can be set temporarily by software to complete a corresponding operation. Some specific implementations (mechanical methods, dedicated permanent circuits, or temporarily disposed circuits) can be determined based on cost and time considerations.

The specific implementations illustrated above with reference to the accompanying drawings describe some example embodiments, but do not represent all embodiments that can be implemented or fall within the protection scope of the claims. The term "example" used throughout this specification means "used as an example, an instance, or an illustration", but does not mean "preferred" or "advantageous" over other embodiments. Specific implementations include specific details for the purpose of providing an understanding of the described technologies. However, these technologies can be implemented without these specific details. In some instances, to avoid obscuring the described concepts in the embodiments, well-known structures and apparatuses are shown in the form of a block diagram.

The above-mentioned descriptions of this application are provided to enable any person of ordinary skill in the art to implement or use this application. Various modifications made to this application are clear to a person of ordinary skill in the art, and the general principles defined in this specification can also be applied to other variants without departing from the protection scope of this application. Therefore, this application is not limited to the examples and designs described in this specification, but corresponds to the widest scope of principles and novel features disclosed in this specification.

What is claimed is:

1. A computer-implemented method for voice intention understanding voice data processing, comprising:
   performing voice data feature extraction on voice data to obtain first feature data;
   performing local frequency domain transform processing on the first feature data to obtain at least one feature map, wherein each at least one feature map comprises a plurality of elements and corresponds to one data block in the first feature data, and each element corresponds to one frequency in a frequency domain;
   separately using an element corresponding to each frequency in the at least one feature map to construct, as constructed frequency component channel feature maps, a frequency component channel feature map corresponding to each frequency; and
   selecting, as a selected target frequency component feature map, at least one target frequency component channel feature map from the constructed frequency component channel feature maps to obtain desensitized feature data of the voice data, wherein the selected target frequency component feature map is a critical channel feature for voice intention understanding and is a non-critical channel feature for voice signal recognition.

2. The computer-implemented method of claim 1, wherein, after selecting at least one target frequency component channel feature map from the constructed frequency component channel feature maps:
   performing first shuffling processing on the at least one target frequency component channel feature map to obtain a first shuffling feature map.

3. The computer-implemented method of claim 2, comprising:
   performing, to obtain a normalized first shuffling feature map and the desensitized feature data of the voice data, normalization processing on the first shuffling feature map.

4. The computer-implemented method of claim 1, wherein the voice data feature extraction comprises Fbank-based voice data feature extraction.

5. The computer-implemented method of claim 1, wherein local frequency domain transform processing comprises a transform processing of at least one of: a local discrete cosine transform, a local wavelet transform, and a local discrete Fourier transform.

6. The computer-implemented method of claim 1, wherein selecting at least one target frequency component channel feature map from the constructed frequency component channel feature maps, comprises:

selecting, based on a channel importance or a predetermined filtering rule, the at least one target frequency component channel feature map from the constructed frequency component channel feature maps.

7. The computer-implemented method of claim 6, wherein the channel importance is determined based on an SEnet network.

8. The computer-implemented method of claim 6, wherein the predetermined filtering rule, comprises:

retaining a predetermined quantity of low frequency component channel feature maps in ascending order of frequencies.

9. The computer-implemented method of claim 3, wherein, after performing, to obtain a normalized first shuffling feature map and the desensitized feature data of the voice data, normalization processing on the first shuffling feature map:

performing channel mixing processing on the normalized first shuffling feature map to obtain a channel-mixed first shuffling feature map.

10. The computer-implemented method of claim 9, comprising:

performing second shuffling processing on the channel-mixed first shuffling feature map to obtain a second shuffling feature map.

11. The computer-implemented method of claim 10, comprising:

performing, to obtain a normalized second shuffling feature map and the desensitized feature data of the voice data, normalization processing on the second shuffling feature map.

12. The computer-implemented method of claim 11, wherein:

a quantity of the at least one target frequency component channel feature map is a feature dimension of the first feature data plus one.

13. The computer-implemented method of claim 12, wherein:

performing channel mixing processing on the normalized first shuffling feature map to obtain a channel-mixed first shuffling feature map, comprises:

performing channel mixing on two adjacent frequency component channel feature maps in the first shuffling feature map.

14. The computer-implemented method of claim 12, wherein first shuffling processing comprises pseudo-random shuffling processing.

15. The computer-implemented method of claim 14, wherein:

the second shuffling processing comprises completely random shuffling processing.

16. The computer-implemented method of claim 1, wherein a normalization coefficient in normalization processing for each frequency component channel feature map is determined based on a corresponding frequency component channel feature map.

17. The computer-implemented method of claim 12, comprising:

equally dividing, in a time sequence direction to obtain an equally divided second shuffling feature map, the normalized second shuffling feature map.

18. The computer-implemented method of claim 17, comprising:

randomly shuffling and then re-concatenating, to obtain the desensitized feature data of the voice data, the equally divided second shuffling feature map.

19. A non-transitory, computer-readable medium storing one or more instructions executable by a computer system to perform one or more operations for voice intention understanding voice data processing, comprising:

performing voice data feature extraction on voice data to obtain first feature data;

performing local frequency domain transform processing on the first feature data to obtain at least one feature map, wherein each at least one feature map comprises a plurality of elements and corresponds to one data block in the first feature data, and each element corresponds to one frequency in a frequency domain;

separately using an element corresponding to each frequency in the at least one feature map to construct, as constructed frequency component channel feature maps, a frequency component channel feature map corresponding to each frequency; and selecting, as a selected target frequency component feature map, at least one target frequency component channel feature map from the constructed frequency component channel feature maps to obtain desensitized feature data of the voice data, wherein the selected target frequency component feature map is a critical channel feature for voice intention understanding and is a non-critical channel feature for voice signal recognition.

20. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, for voice intention understanding voice data processing, comprising:

performing voice data feature extraction on voice data to obtain first feature data;

performing local frequency domain transform processing on the first feature data to obtain at least one feature map, wherein each at least one feature map comprises a plurality of elements and corresponds to one data block in the first feature data, and each element corresponds to one frequency in a frequency domain;

separately using an element corresponding to each frequency in the at least one feature map to construct, as constructed frequency component channel feature maps, a frequency component channel feature map corresponding to each frequency; and selecting, as a selected target frequency component feature map, at least one target frequency component channel feature map from the constructed frequency component channel feature maps to obtain desensitized feature data of the voice data, wherein the selected target frequency component feature map is a critical channel feature for voice intention understanding and is a non-critical channel feature for voice signal recognition.

* * * * *